US012587466B2

(12) United States Patent
Velayudhan et al.

(10) Patent No.: US 12,587,466 B2
(45) Date of Patent: Mar. 24, 2026

(54) ACTIVE-STANDBY SWITCHOVER IN BORDER GATEWAY PROTOCOL (BGP) NETWORK USING GRACEFUL ATTRACT COMMUNITY

(71) Applicant: Pensando Systems Inc., Milpitas, CA (US)

(72) Inventors: Mukesh Moopath Velayudhan, Fremont, CA (US); Sanjay Thyamagundalu, Sunnyvale, CA (US); Vijay Srinivasan, Santa Clara, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 410 days.

(21) Appl. No.: 17/984,148

(22) Filed: Nov. 9, 2022

(65) Prior Publication Data

US 2024/0154897 A1 May 9, 2024

(51) Int. Cl.
| | |
|---|---|
| *H04L 45/02* | (2022.01) |
| *H04L 45/48* | (2022.01) |
| *H04L 45/745* | (2022.01) |

(52) U.S. Cl.
CPC .............. *H04L 45/04* (2013.01); *H04L 45/48* (2013.01); *H04L 45/745* (2013.01)

(58) Field of Classification Search
None
See application file for complete search history.

(56) References Cited

U.S. PATENT DOCUMENTS

| | | | | |
|---|---|---|---|---|
| 7,609,619 B2 * | 10/2009 | Naseh | ..................... | H04L 45/04 |
| | | | | 370/225 |
| 8,559,414 B2 * | 10/2013 | Yilmaz | ................... | H04L 45/52 |
| | | | | 709/239 |
| 9,276,804 B2 * | 3/2016 | Carney | .................. | G06Q 20/40 |
| 10,200,274 B1 * | 2/2019 | Suryanarayana | ....... | H04L 49/70 |

(Continued)

OTHER PUBLICATIONS

McCall, William "Recent BGP Innovations for Operational Challenges", AusNOG 2019, Melbourne, 43 pgs.

(Continued)

*Primary Examiner* — Xavier S Wong
(74) *Attorney, Agent, or Firm* — LOZA & LOZA, LLP; Mark A. Wilson

(57) ABSTRACT

Methods and systems for active-standby switchover are disclosed. Embodiments of the present technology may include a method for operating a network with active and standby host nodes that involves transmitting a Border Gateway Protocol (BGP) route advertisement message from the standby host node, the BGP route advertisement message including route information and a community tag that is indicative of a graceful attract community, receiving the BGP route advertisement message at leaf nodes and spine nodes of the network, wherein the leaf nodes and the spine nodes assign higher BGP preference to the route information in the BGP route advertisement message in response to identifying the community tag in the BGP route advertisement message as being indicative of a graceful attract community, and transmitting a BGP route withdraw message from the active host node after the BGP route advertisement message is transmitted from the standby host node.

16 Claims, 17 Drawing Sheets

(56) References Cited

U.S. PATENT DOCUMENTS

| | | | |
|---|---|---|---|
| 2006/0193247 A1* | 8/2006 | Naseh | H04L 45/22 |
| | | | 370/216 |
| 2014/0331308 A1* | 11/2014 | Smith | H04L 63/1441 |
| | | | 726/11 |
| 2017/0093965 A1 | 3/2017 | Evens | |
| 2019/0363975 A1 | 11/2019 | Djernaes | |
| 2020/0067822 A1 | 2/2020 | Malhotra et al. | |
| 2020/0313956 A1 | 10/2020 | Heitz et al. | |
| 2021/0168073 A1 | 6/2021 | Rao et al. | |
| 2021/0184930 A1 | 6/2021 | Mutnuru et al. | |
| 2021/0194711 A1 | 6/2021 | Nagarajan et al. | |
| 2021/0390000 A1 | 12/2021 | Malhotra et al. | |
| 2022/0321478 A1 | 10/2022 | Vasudevan et al. | |
| 2023/0319082 A1* | 10/2023 | Cameron | H04L 43/0876 |
| | | | 726/22 |

OTHER PUBLICATIONS

Cisco, "BGP Graceful Shutdown", IP Routing: BGP Configuration Guide, Cisco IOS XE Release 3S (Cisco ASR 903), (2014), 10 pgs.

Lenova, "Introduction to Spine-Leaf Networking Designs", Nov. 7, 2017, 25 pgs.

Abhashkumar, Anubhavnidhi et al. "Running BGP in Data Centers at Scale", Usenix Association, 18th USENIX Symposium on Networked Systems Design and Implementation, Apr. 12-14, 2021, 18 pgs.

Decraene, B. et al. "Requirements for the Graceful Shutdown of BGP Sessions", Internet Engineering Task Force (IETF), Request for Comments: 6198, Apr. 2011, 20 pgs.

Francois, P. Ed. et al. "Graceful BGP Session Shutdown", Internet Engineering Task Force (IETF), Request for Comments: 8326, Mar. 2018, 12 pgs.

Van Den Schrieck et al. "Preventing the Unnecessary Propagation of BGP Withdraws", Networking 2009, LNCS 5550, (2009), pp. 495-508.

* cited by examiner

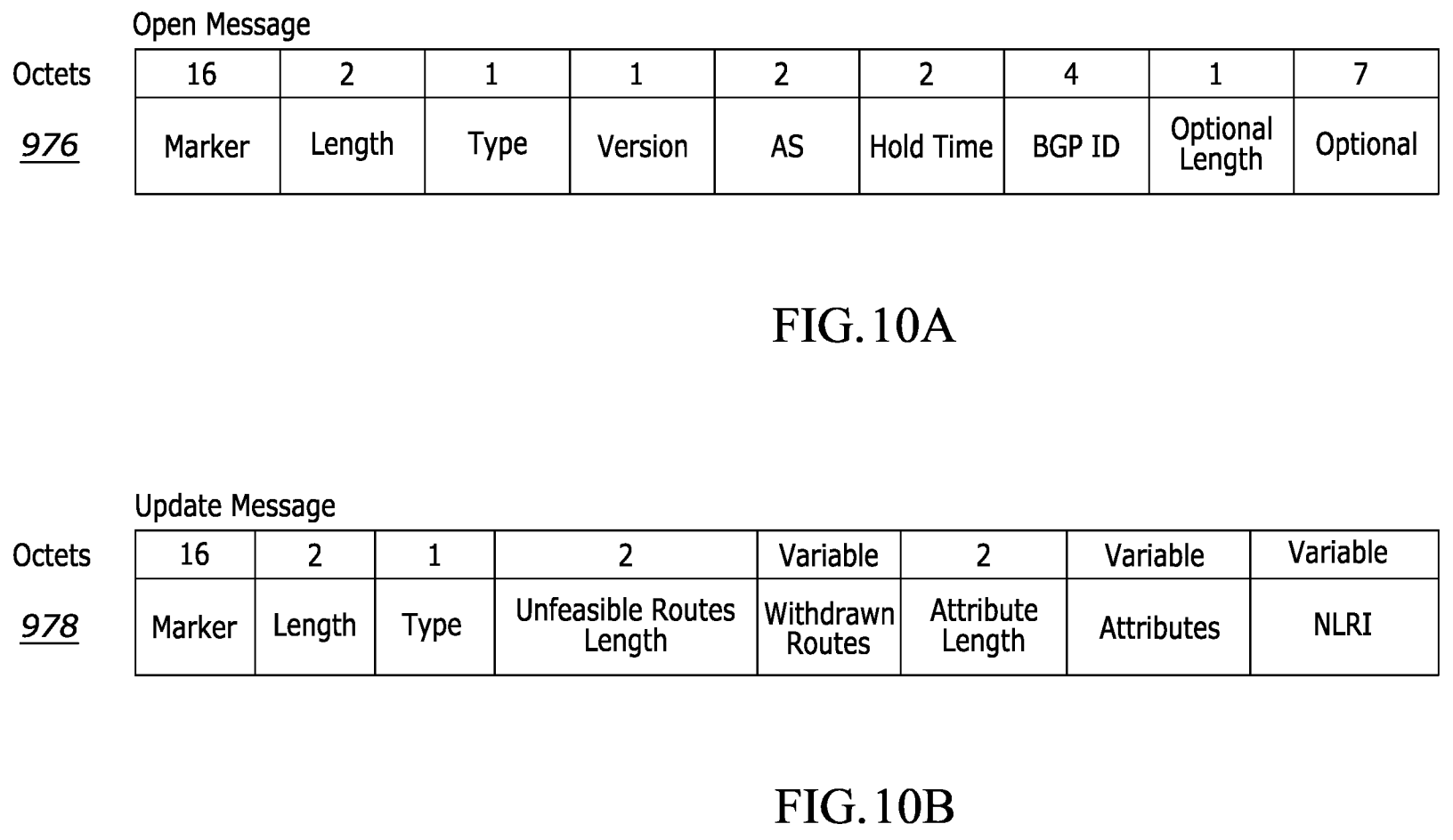

Octets

Open Message

976

| 16 | 2 | 1 | 1 | 2 | 2 | 4 | 1 | 7 |
|---|---|---|---|---|---|---|---|---|
| Marker | Length | Type | Version | AS | Hold Time | BGP ID | Optional Length | Optional |

FIG.10A

Octets

Update Message

978

| 16 | 2 | 1 | 2 | Variable | 2 | Variable | Variable |
|---|---|---|---|---|---|---|---|
| Marker | Length | Type | Unfeasible Routes Length | Withdrawn Routes | Attribute Length | Attributes | NLRI |

FIG.10B

Notification Message

| Octets | 16 | 2 | 1 | 1 | 1 | Variable |
|---|---|---|---|---|---|---|
| 980 | Marker | Length | Type | Error Code | Error Sub-Code | Diagnostics Data |

FIG.10C

Keepalive Message

| Octets | 16 | 2 | 1 |
|---|---|---|---|
| 982 | Marker | Length | Type |

FIG.10D

Route - Refresh Message

| Octets | 16 | 2 | 1 | 2 | 1 | 1 |
|---|---|---|---|---|---|---|
| 984 | Marker | Length | Type | Address Family Identifier | Reserved | Subsequent Address Family Identifier |

| Type Code Value | Attribute Name | Category |
|---|---|---|
| 1 | ORIGIN | Well-Known Mandatory |
| 2 | AS_PATH | Well-Known Mandatory |
| 3 | NEXT_HOP | Well-Known Mandatory |
| 4 | MULTI_EXIT_DISK (MED) | Optional Non-Transitive |
| 5 | LOCAL_PREF | Well-Known Discretionary |
| 6 | ATOMIC_AGGREGATE | Well-Known Discretionary |
| 7 | AGGREGATOR | Optional Transitive |
| 8 | COMMUNITY | Optional Transitive |
| 9 | ORIGINATOR_ID | Optional Non-Transitive |
| 10 | Cluster List | Optional Non-Transitive |
| 11 | DPA | Designation Point Attribute |
| 12 | Advertiser | BGP/IDRP Route Server |
| 13 | RCID_PATH/CLUSTER_ID | BGP/IDRP Route Server |
| 14 | Multiprotocol Reachable NLRI | Optional Non-Transitive |
| 15 | Multiprotocol Unreachable NLRI | Optional Non-Transitive |
| 16 | Extended Communities | |
| 256 | Reversed For Future Development | |

```
>  Ethernet IT, Src: 02:42:0a:01:01:01 (02:42:0a:01:01:01),
   Dst: 02:42:0a:01:01:02 (02:42:0a
>  Internet Protocol Version 4, Src: 10.1.1.1, Dst: 10.1.1.2
>  Transmission Control Protocol, Src Port: 39668, Dst Port:
   179, Seq: 118, Ack: 39, Len: 67
v  Border Gateway Protocol - UPDATE Message
      Marker: ffffffffffffffffffffffffffffffff
      Length: 67
      Type: UPDATE Message (2)
      Withdrawn Routes Length: 0
      Total Path Attribute Length: 39
   v  Path attribute
      v  Path Attribute - ORIGIN: INCOMPLETE
         >  Flags: 0x40, Transitive, Well-known, Complete
            Type Code: ORIGIN (1)
            Length: 1
            Origin: INCOMPLETE (2)
      v  Path Attribute - AS_PATH: 65536 65536 65536 65536
         >  Flags: 0x40, Transitive, Well-known, Complete
            Type Code: AS_PATH (2)
            Length: 18
         v  AS Path segment: 65536 65536 65536 65536
               Segment type: AS_SEQUENCE (2)
               Segment length (number of ASN) : 4
               AS4: 65536
               AS4: 65536
               AS4: 65536
               AS4: 65536
      v  Path Attribute - NEXT_HOP: 10.1.1.1
         >  Flags: 0x40, Transitive, Well-known, Complete
            Type Code: NEXT_HOP (3)
            Length: 4
            Next hop: 10.1.1.1
      v  Path Attribute - COMMUNITIES: 65520:1
         >  Flags: 0xc0, Optional, Transitive, Complete
            Type Code: COMMUNITIES (8)
            Length: 4
         >  Communities: 65520:1
      v  Network Layer Reachability Information (NLRI)
         v  100.100.1.1/32
               NLRI prefix length: 32
               NLRI prefix: 100.100.1.1
```

FIG. 12

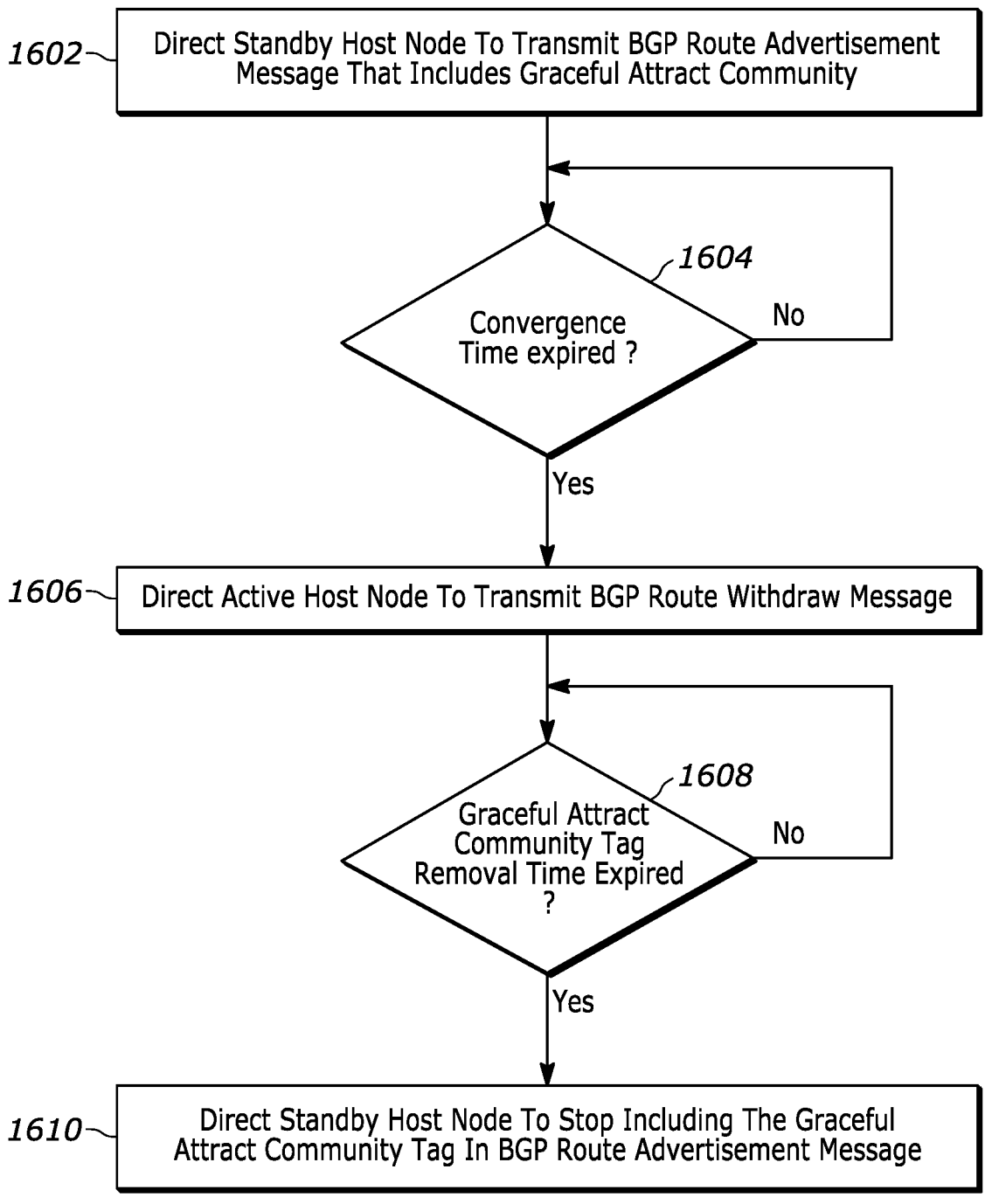

1602 — Direct Standby Host Node To Transmit BGP Route Advertisement Message That Includes Graceful Attract Community 1604 — Convergence Time expired ?    No Yes 1606 — Direct Active Host Node To Transmit BGP Route Withdraw Message 1608 — Graceful Attract Community Tag Removal Time Expired ?    No Yes 1610 — Direct Standby Host Node To Stop Including The Graceful Attract Community Tag In BGP Route Advertisement Message

FIG.16

ACTIVE-STANDBY SWITCHOVER IN BORDER GATEWAY PROTOCOL (BGP) NETWORK USING GRACEFUL ATTRACT COMMUNITY

BACKGROUND

Some data center networks (DCNs) utilize redundantly connected leaf-spine topologies. Further, to provide high availability (HA) of a particular network service, the network service may be supported by an active host node and a standby host node. In an active-standby configuration, it is sometimes desirable to perform a planned switchover from the active host node to the standby host node. Although various techniques have been used to implement a planned switchover from an active host node to a standby host node, dropped packets/packet loss is an ongoing concern.

SUMMARY

Methods and systems for active-standby switchover are disclosed. In an embodiment, a network appliance includes memory, one or more processors, a host interface, a network interface, and a packet processing pipeline circuit, the memory, one or more processors, host interface, network interface, and packet processing pipeline circuit configured to receive a Border Gateway Protocol (BGP) route advertisement message at the network node, match a community tag in the route advertisement message to a graceful attract community, in response to matching the community tag in the route advertisement message to the graceful attract community, set a local-preference attribute in a route-map of the network node for a route in the BGP route advertisement message, wherein the route that is set with the local-preference attribute corresponds to a standby host node, and route traffic to the standby host node according to the route-map.

In an embodiment, setting the local-preference in the route-map of the network node prioritizes a route to the standby host node over a route to an active host node.

In an embodiment, setting the local-preference in the route-map of the network node changes a route to a destination IP address from a route to an active host node in the network to a route to the standby host node in the network.

An embodiment of a method for operating a network node is disclosed. The method involves receiving a BGP route advertisement message at the network node, matching a community tag in the route advertisement message to a graceful attract community, in response to matching the community tag in the route advertisement message to the graceful attract community, setting a local-preference attribute in a route-map of the network node for a route in the BGP route advertisement message, wherein the route that is set with the local-preference attribute corresponds to a standby host node, and routing traffic to the standby host node according the route route-map.

In an embodiment, setting the local-preference in the route-map of the network node prioritizes a route to the standby host node over a route to the active host node.

In an embodiment, setting the local-preference in the route-map of the network node changes a route to a destination IP address from a route to an active host node in a network to a route to the standby host node in the network.

In an embodiment, the method further involves setting the local-preference attribute in the route-map for the route information in the BGP route advertisement message with the community tag that matches the graceful attract community when the BGP route advertisement message with the community tag that matches the graceful attract community is received directly from the standby host node but not when the BGP route advertisement message with the community tag that matches the graceful attract community is received from a spine node.

In an embodiment, the network node compares an ASN in a BGP route advertisement message with its own ASN to determine whether or not the BGP route advertisement message with the community tag that matches the graceful attract community was received directly from the standby host node.

Embodiments of the present technology may include a method for operating a network with active and standby host nodes that involves transmitting a Border Gateway Protocol (BGP) route advertisement message from the standby host node, the BGP route advertisement message including route information and a community tag that is indicative of a graceful attract community, receiving the BGP route advertisement message at leaf nodes and spine nodes of the network, wherein the leaf nodes and the spine nodes assign higher BGP preference to the route information in the BGP route advertisement message in response to identifying the community tag in the BGP route advertisement message as being indicative of a graceful attract community, and transmitting a BGP route withdraw message from the active host node after the BGP route advertisement message is transmitted from the standby host node.

In an embodiment, the method further involves, after the BGP route advertisement message is transmitted from the standby host node and after the BGP route withdraw message is transmitted from the active host node, transmitting additional BGP route advertisement messages from the standby host node without the community tag.

In an embodiment, assigning higher BGP preference to the route information in the BGP route advertisement message in response to identifying the community tag as being indicative of a graceful attract community comprises prioritizing a route to the standby host node over a route to the active host node.

In an embodiment, assigning higher BGP preference to the route information in the BGP route advertisement message in response to identifying the community tag as being indicative of a graceful attract community comprises prioritizing, in route tables maintained at the leaf and spine nodes, a route to the standby host node over a route to the active host node.

In an embodiment, assigning higher BGP preference to the route information in the BGP route advertisement message in response to identifying the community tag as being indicative of a graceful attract community comprises finding a match of the community tag in a route-map and setting a local-preference attribute corresponding to the route information.

In an embodiment, the method further involves, at the leaf nodes, assigning higher BGP preference to the route information in the BGP route advertisement message with the community tag when the BGP route advertisement message with the community tag is received directly from the standby host node but not when the BGP route advertisement message with the community tag is received from a spine node.

In an embodiment, a leaf node compares an AS Number (ASN) in a BGP route advertisement message with its own ASN to determine whether or not the BGP route advertisement message was received directly from the standby host node.

In an embodiment, the method further involves configuring forwarding tables of the leaf nodes and the spine nodes with a higher BGP preference for the standby host node in response to identifying the community tag as indicating a graceful attract community.

An embodiment of a non-transitory computer readable medium, which stores computer readable instructions, which when executed by one or more processors, implements a method for operating a network with active and standby host node, is disclosed. The method involves transmitting a BGP route advertisement message from the standby host node, the BGP route advertisement message including route information and a community tag, receiving the BGP route advertisement message at leaf nodes and spine nodes of the network, wherein the leaf nodes and the spine nodes assign higher BGP preference to the route information in the BGP route advertisement message in response to identifying the community tag in the BGP route advertisement message as being indicative of a graceful attract community, and transmitting a BGP route withdraw message from the active host node after the BGP route advertisement message is transmitted from the standby host node.

A system is also disclosed. The system includes an active host node, a standby host node, and a mesh fabric of leaf nodes and spine nodes that connect to the active host node and to the standby host node, wherein the standby host node is configured to transmit a BGP route advertisement message, the BGP route advertisement message including route information and a community tag that is indicative of a graceful attract community, wherein the leaf nodes and the spine nodes are configured to receive the BGP route advertisement message, wherein the leaf nodes and the spine nodes assign higher BGP preference to the route information in the BGP route advertisement message in response to identifying the community tag in the BGP route advertisement message as being indicative of a graceful attract community, and wherein the active host node is configured to transmit a BGP route withdraw message from the active host node after the BGP route advertisement message is transmitted from the standby host node.

In an embodiment, the standby host node is further configured to, after the BGP route advertisement message is transmitted from the standby host node and after the BGP route withdraw message is transmitted from the active host node, transmit additional BGP route advertisement messages from the standby host node without the community tag.

In an embodiment, after the BGP route advertisement message is transmitted from the standby host node and after the BGP route withdraw message is transmitted from the active host node, transmitting additional BGP route advertisement messages from the standby host node without the community tag.

In an embodiment, assigning higher BGP preference to the route information in the BGP route advertisement messages in response to identifying the community tag comprises prioritizing a route to the standby host node over a route to the active host node.

In an embodiment, assigning higher BGP preference to the route information in the BGP route advertisement messages in response to identifying the community tag comprises prioritizing, in route tables maintained at the leaf nodes and the spine nodes, a route to the standby host node over a route to the active host node.

In an embodiment, assigning higher BGP preference to the route information in the BGP route advertisement message in response to identifying the community tag as being indicative of a graceful attract community comprises finding a match of the community tag in a route-map and setting a local-preference attribute corresponding to the route information.

In an embodiment, at the leaf nodes, assigning higher BGP preference to the route information in the BGP route advertisement message with the community tag when the BGP route advertisement message with the community tag is received directly from the standby host node but not when the BGP route advertisement message with the community tag is received from a spine node.

In an embodiment, the leaf nodes compare an ASN in a BGP route advertisement message with their own ASN to determine whether or not the BGP route advertisement message was received directly from the standby host node.

In another embodiment, a non-transitory computer readable medium, which stores computer readable instructions, which when executed by one or more processors, implements a method for orchestrating a switchover from an active host node to a standby host node is disclosed. The method involves directing a standby host node to transmit a BGP route advertisement message to a network that includes leaf nodes and spine nodes, the BGP route advertisement message including route information and a community tag that is indicative of a graceful attract community, wherein receiving the BGP route advertisement message at the leaf nodes and the spine nodes of the network causes the leaf nodes and the spine nodes to assign higher BGP preference to the route information in the BGP route advertisement message in response to identifying the community tag as being indicative of a graceful attract community, directing the active host node to transmit a BGP route withdraw message to the network after the BGP route advertisement message is transmitted from the standby host node, and directing the standby host node to transmit additional BGP route advertisement messages to the network without the community tag after the BGP route advertisement message is transmitted from the standby host node and after the BGP route withdraw message is transmitted from the active host node.

In an embodiment, assigning higher BGP preference to the route information in the BGP route advertisement messages in response to identifying the community tag comprises finding a match of the community tag in a route-map and setting a local-preference attribute corresponding to the route information.

Other aspects in accordance with the invention will become apparent from the following detailed description, taken in conjunction with the accompanying drawings, illustrated by way of example of the principles of the invention.

5

Figure 5:
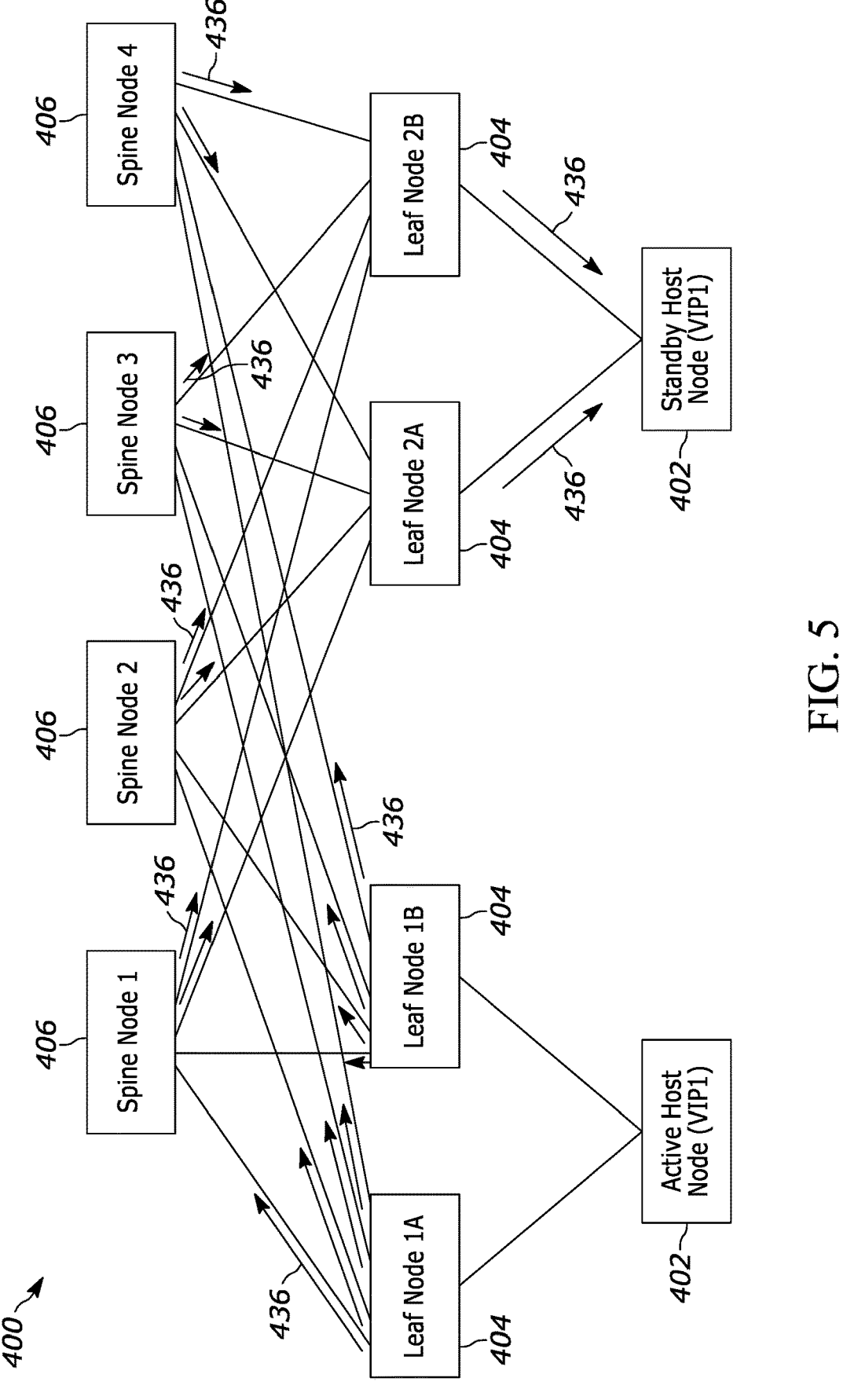

FIG. 5 illustrates the leaf nodes and the spine nodes pointing to the standby host node for traffic intended to destination IP address VIP1 after having received the BGP route advertisement messages with the community tag that is indicative of the graceful attract community.

Figure 6:
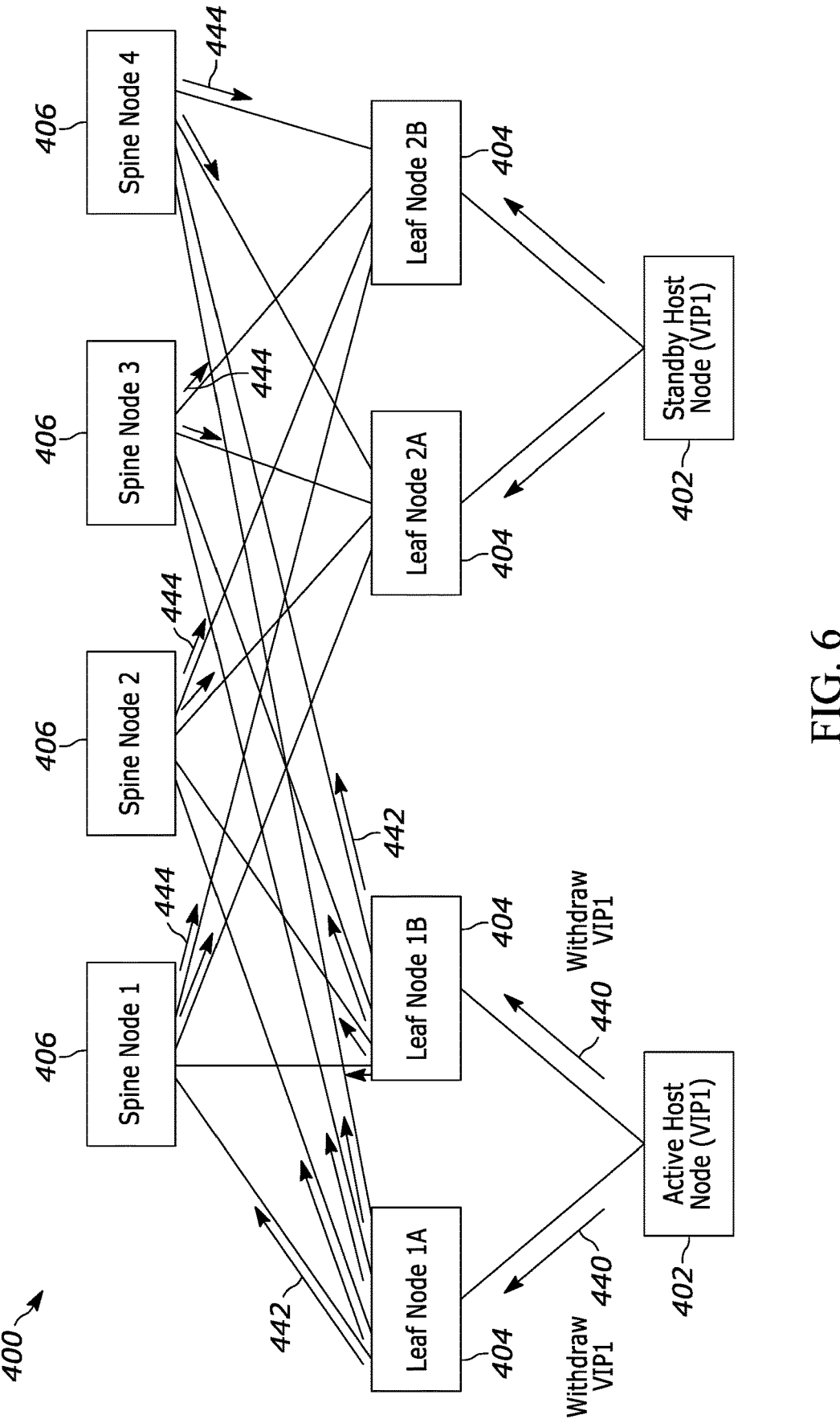

FIG. 6 illustrates the active host node transmitting BGP route withdraw messages (withdraw destination IP address VIP1) to leaf node 1A and leaf node 1B and arrows illustrate the propagation of the BGP route withdrawal messages to the spine nodes 1-4 and to leaf nodes 2A and 2B, respectively.

Figure 7:
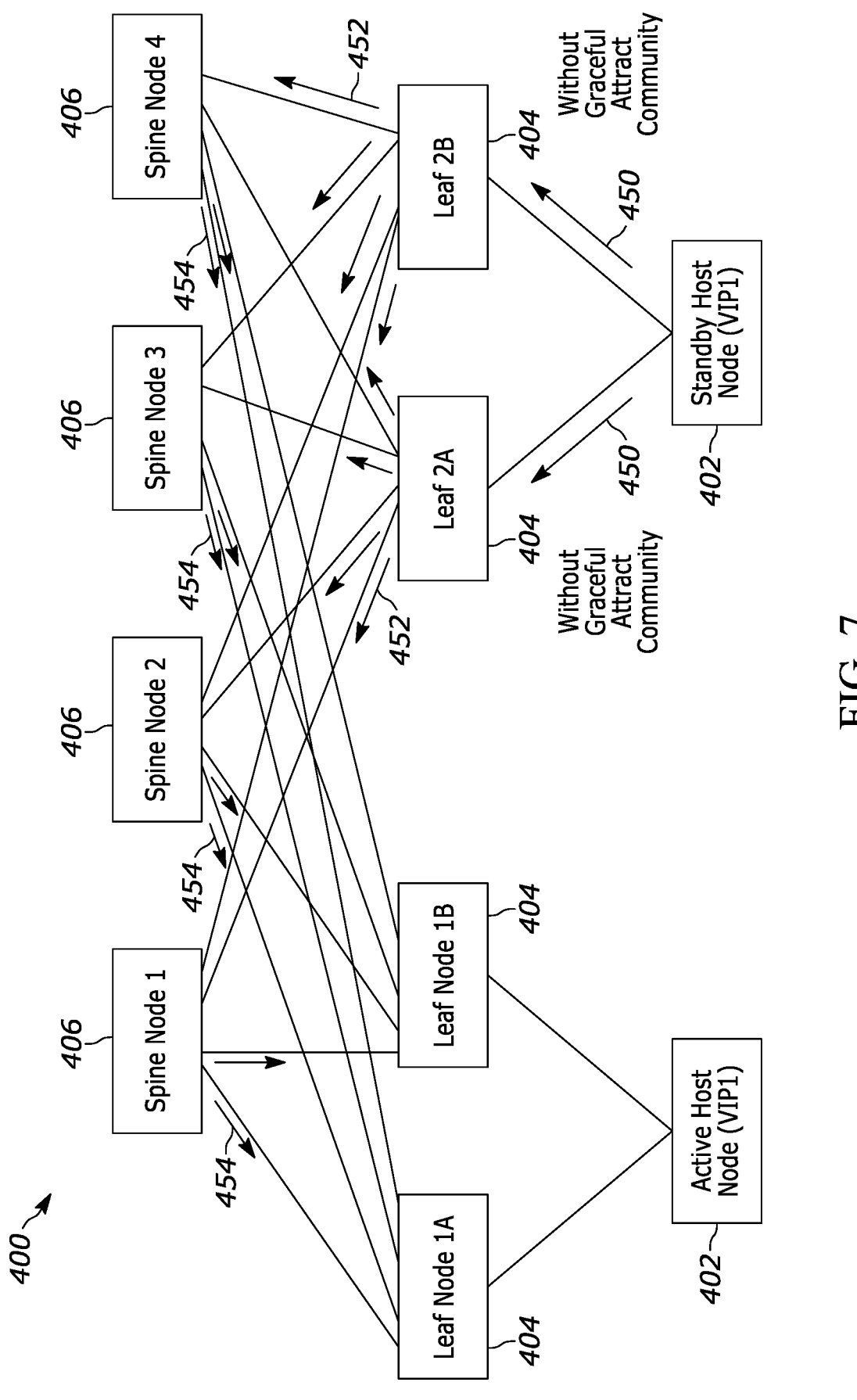

FIG. 7 illustrates the standby host node transmitting additional BGP route advertisement messages to leaf node 2A and to leaf node 2B without the community tag.

Figure 8:
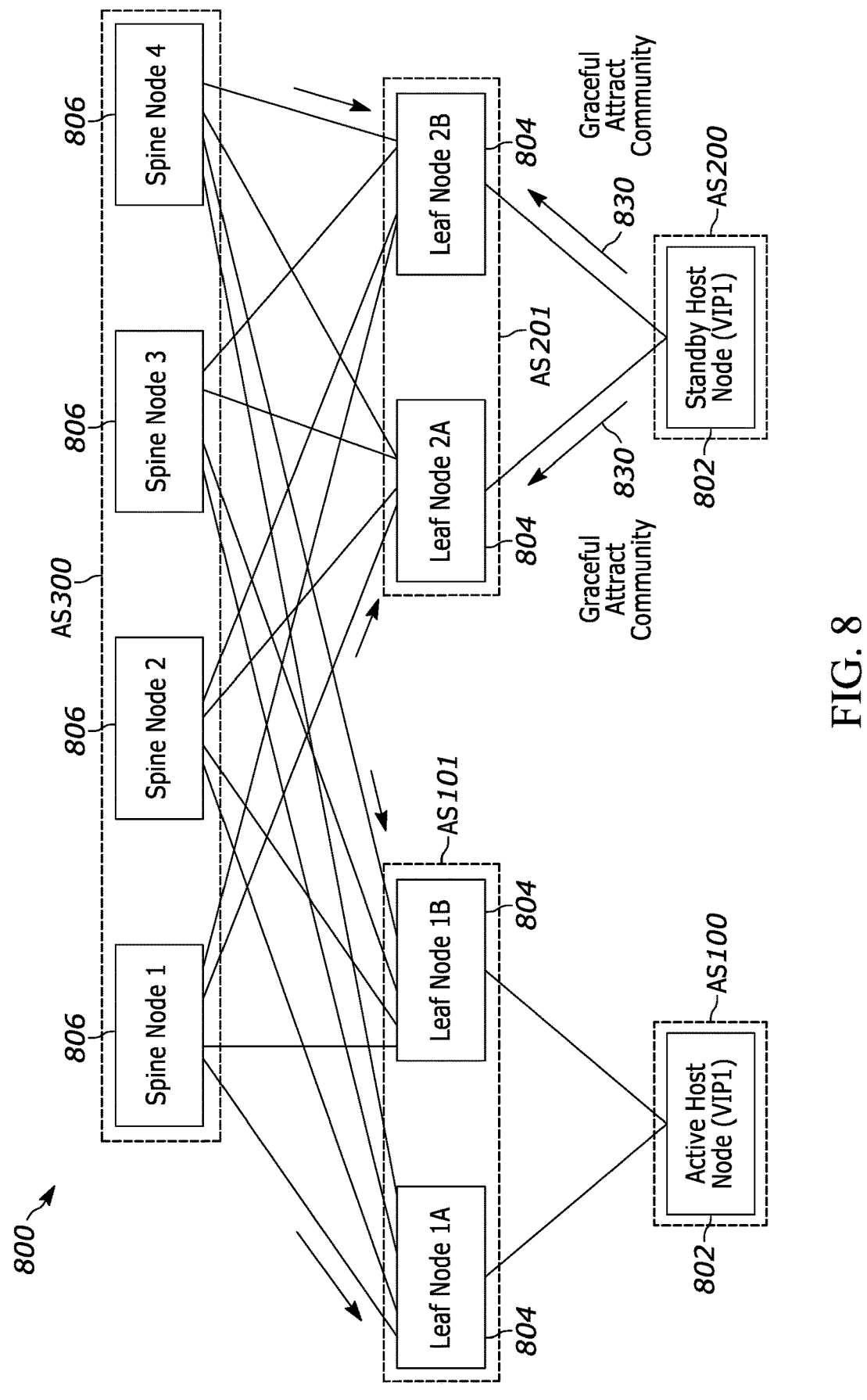

FIG. 8 depicts an example of a network that includes host nodes, leaf nodes, and spine nodes and that is similar to the network.

Figure 9:
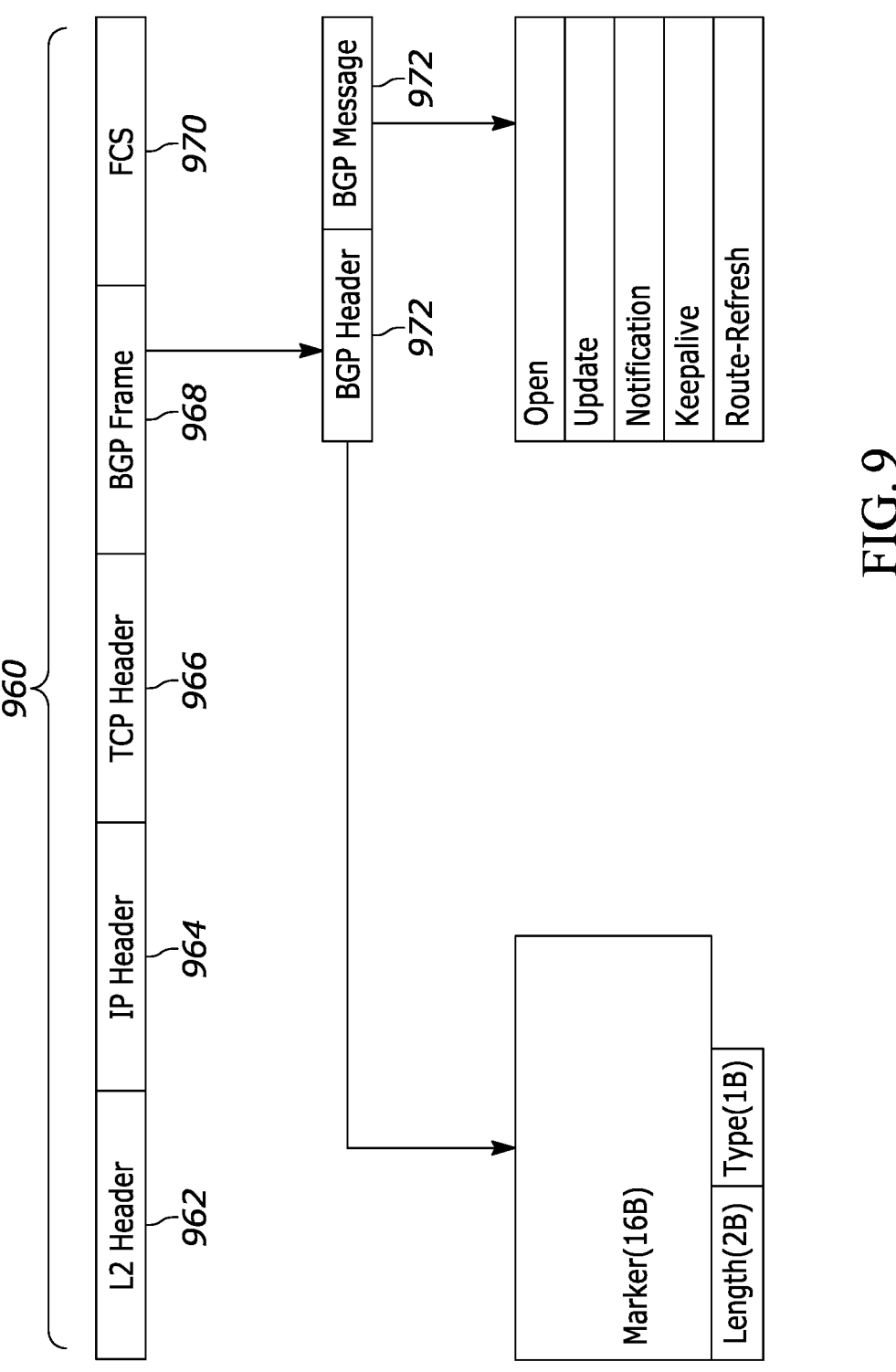

FIG. 9 depicts a Layer 2 frame that includes a Layer 2 (L2) header, an IP header 964, a TCP header 966, a BGP frame 968, and a Frame Check Sequence (FCS).

FIG. 10A depicts an Open message.

FIG. 10B depicts an Update message.

FIG. 10C depicts a Notification message.

FIG. 10D depicts a Keepalive message.

FIG. 10E depicts a Route-Refresh message.

FIG. 11 depicts a table of attribute codes that can be used in BGP Update messages FIG. 12 depicts an embodiment of a frame in text format, in which a community tag, which is indicative of the graceful attract community, is included as a Path Attribute in a BGP Update message.

Figure 13:
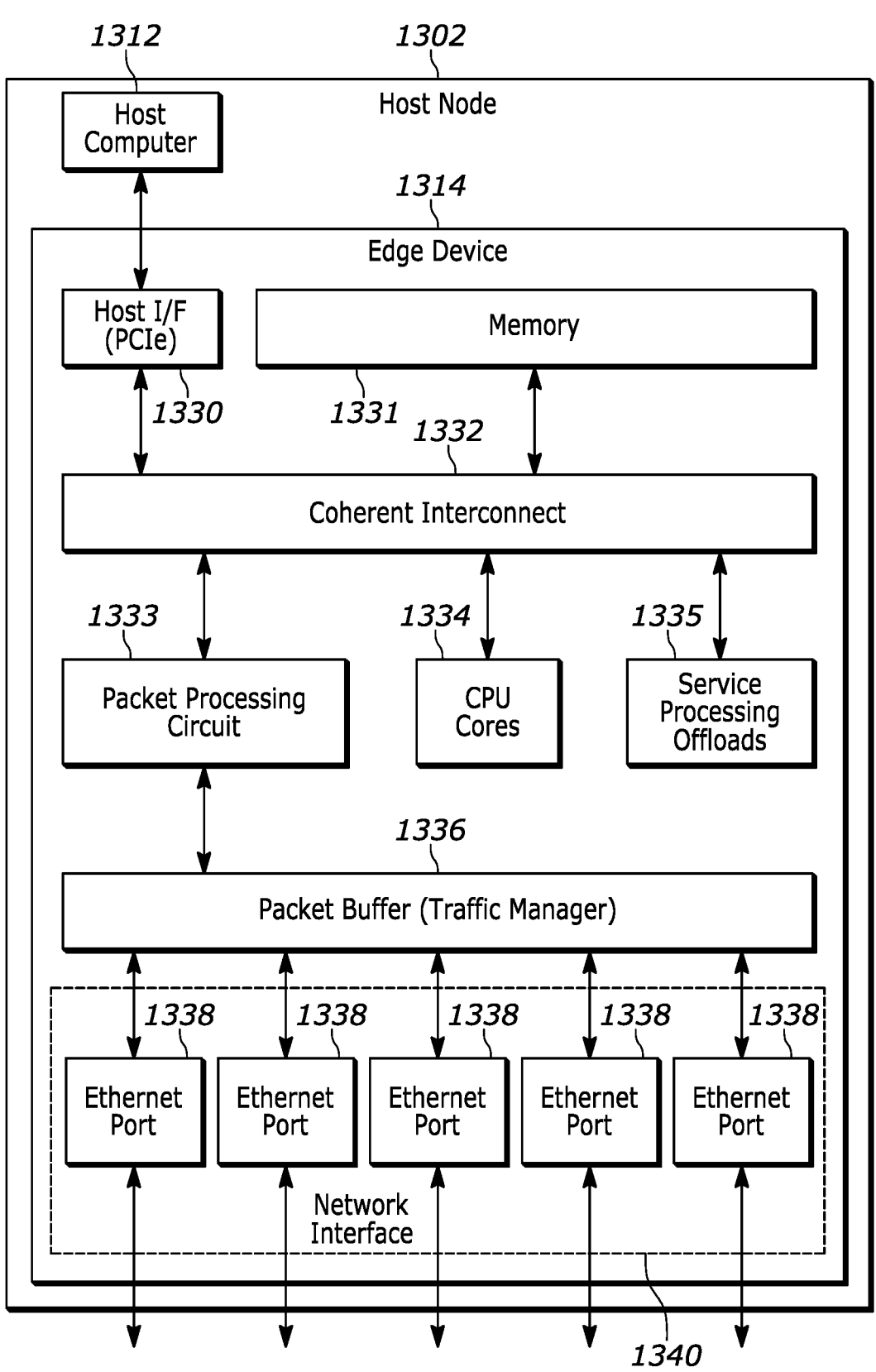

FIG. 13 is an example of a host node that includes an edge device that is configured to run a modified BGP protocol as described herein.

Figure 14:
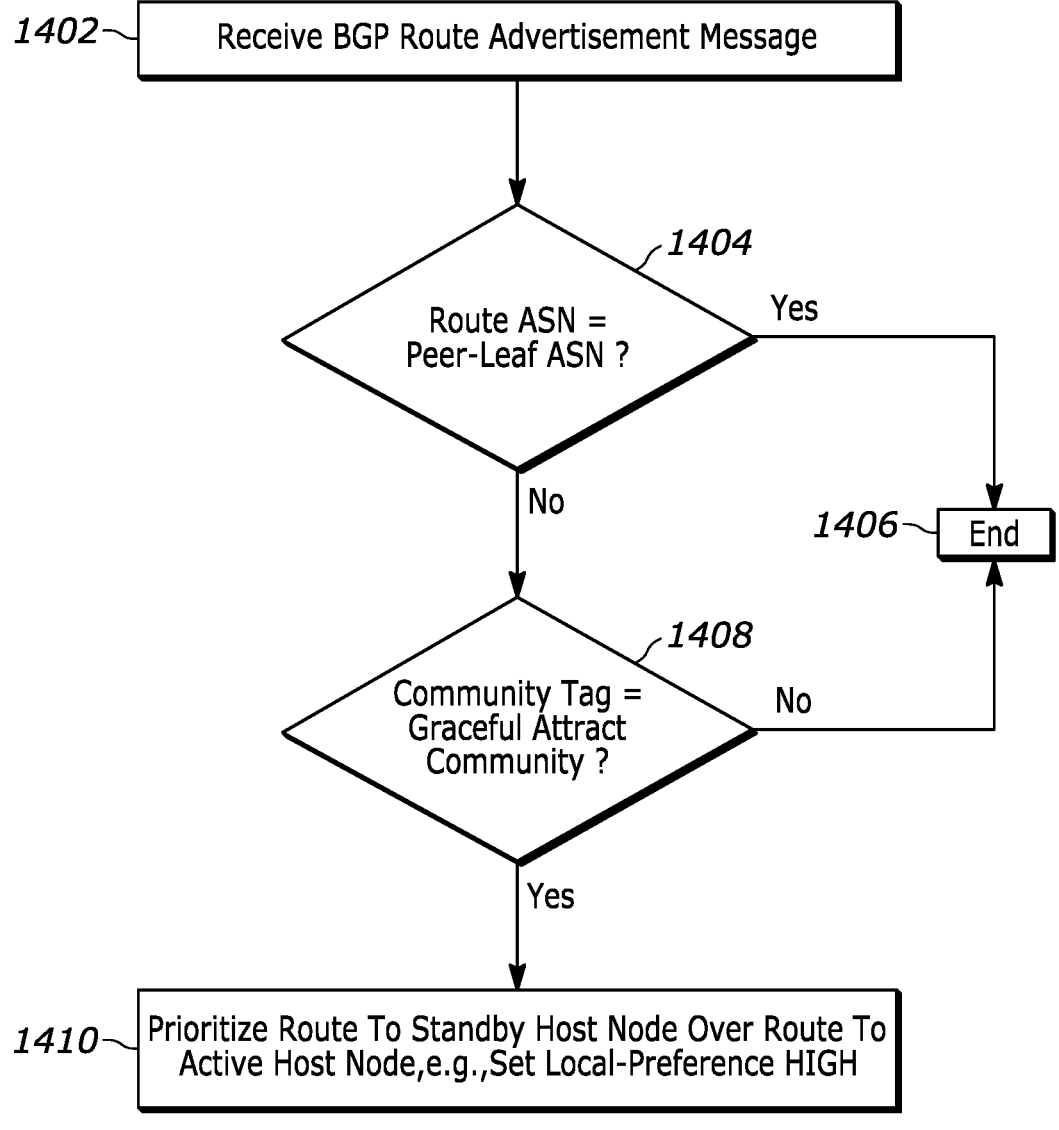

FIG. 14 is a process flow diagram of a method for processing BGP route advertisements that is implemented by an edge device that is integrated into a leaf node and/or a spine node.

Figure 15:
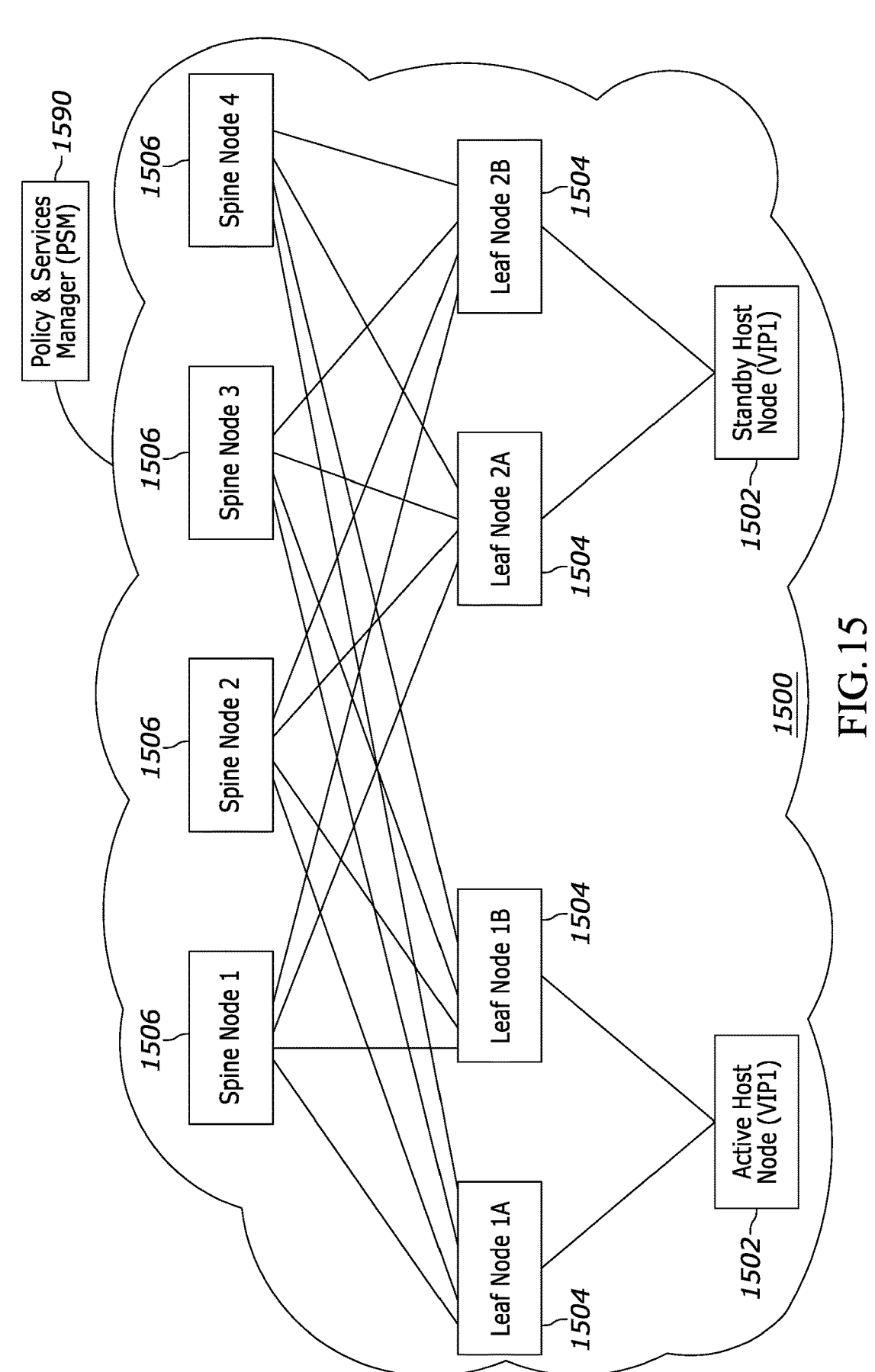

FIG. 15 is an example of a policy and services manager (PSM) that is connected to a leaf-spine network such as the leaf-spine network described above.

FIG. 16 is a process flow diagram of a method for orchestrating a switchover from an active host node to a standby host node that can be implemented by, for example, the PSM as shown in FIG. 15.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
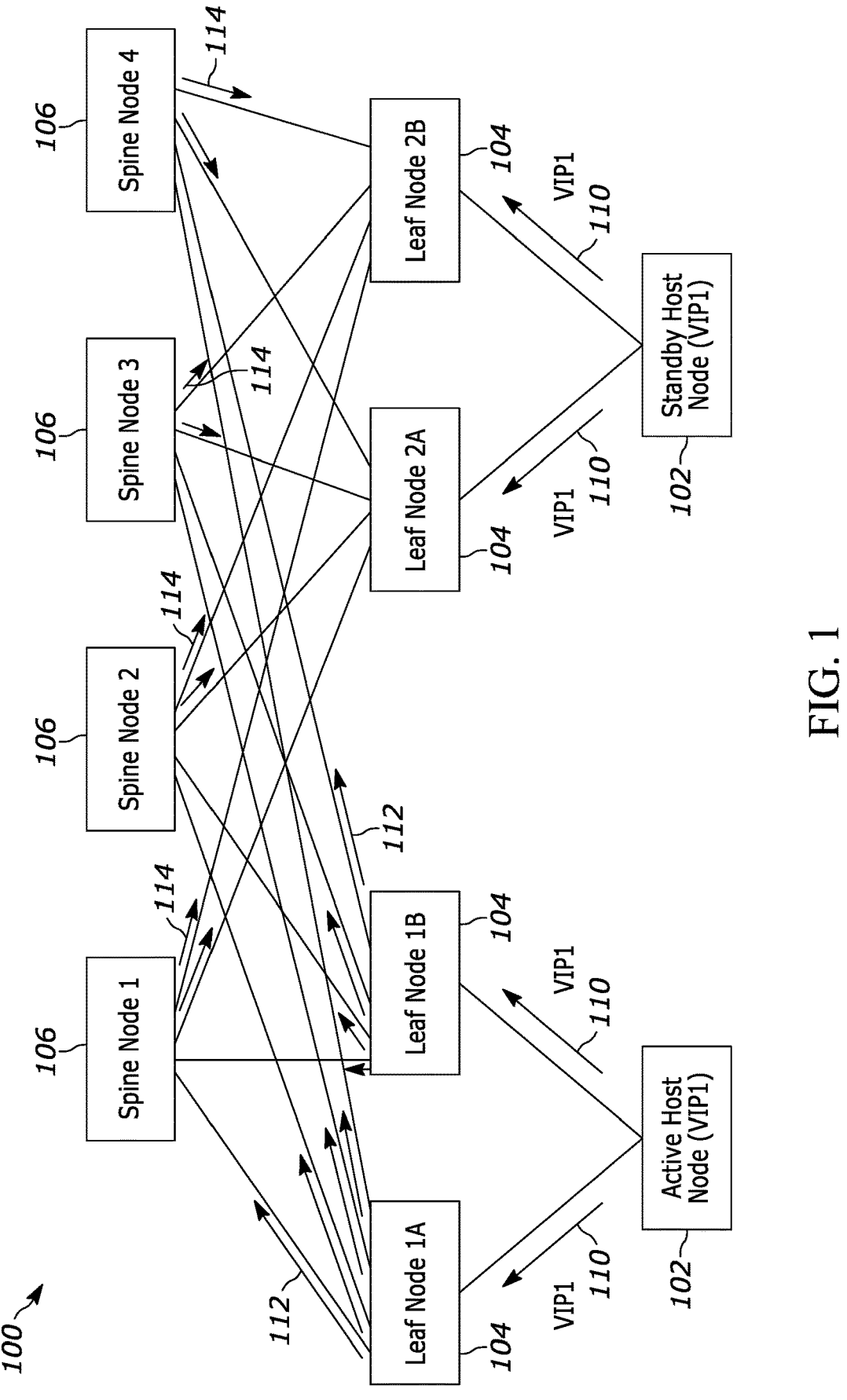
FIG. 1 depicts an example of a network that includes host nodes, leaf nodes, and spine nodes.

FIG. 1 depicts an example of a network 100 that includes host nodes 102, leaf nodes 104, and spine nodes 106. The host nodes may include computer systems such as servers, storage systems, firewalls, and edge routers to name a few. The leaf nodes are routing devices that manage traffic between the host nodes and the spine nodes, and the spine nodes are routing devices that manage traffic to and from the leaf nodes and possibly into and out of the network, e.g., to a broader network such as the Internet. In the network shown in FIG. 1, every leaf node connects to every spine node to form a mesh fabric between the leaf nodes and the spine nodes. However, no leaf node is directly connected to another leaf node and no spine node is directly connected to another spine node. In the embodiment of FIG. 1, the network includes two host nodes that are redundantly connected to leaf nodes to provide a network service with a high degree of availability. In such redundant configurations, one host node, referred to as the active host node, provides active support to the high availability network service and the other host node, referred to as the standby host node, provides backup or standby support to the high availability network service. As shown in FIG. 1, each host node is connected to two leaf nodes and each leaf node is connected to four spine nodes although other numbers of host nodes, leaf nodes, and spine nodes are possible in the network. Such a leaf-spine network configuration provides a highly redundant network topology and is often deployed in data center networks (DCNs). In some use cases, the network uses Border Gateway Protocol (BGP) to route traffic between the nodes and the active and standby host nodes advertise the same virtual IP (VIP) address, e.g., VIP1, to support the network service. BGP is a well-known exterior gateway protocol that is used to exchange routing and reachability information among autonomous systems (ASs) on the Internet.

In the example of FIG. 1, BGP route advertisement messages are used to cause traffic intended for VIP1 to be routed to the active host node 102. In particular, FIG. 1 illustrates BGP route advertisement messages 110 being transmitted from both the active host node and the standby host node. As is known in the field, traffic can be made to converge to the active host node by ensuring that the standby host node advertises a longer path, e.g., a longer autonomous system (AS) path to the destination IP address VIP1, than the AS path to the destination IP address VIP1 that is advertised by the active host node. That is, advertised AS path lengths corresponding to the active and standby host nodes can be manipulated to drive traffic, which is destined to a particular IP address (e.g., VIP1), to the desired host node. The arrows 112 projecting from leaf node 1A and leaf node 1B are meant to illustrate the propagation of the BGP route advertisement messages from leaf nodes 1A and 1B to the spine nodes (spine node 1, spine node 2, spine node 3, and spine node 4). The arrows 114 emanating from the spine nodes (spine nodes 1-4) are meant to illustrate the propagation of the BGP route advertisement messages from the spine nodes to leaf node 2A and leaf node 2B. Although not illustrated in FIG. 1, BGP route advertisement messages transmitted from the standby host node are propagated throughout the network similar to the BGP route advertisement messages transmitted from the active host node. In order to ensure that the forwarding tables maintained in the leaf nodes and the spine nodes point to the active host node instead of to the standby host node with respect to VIP1, the AS path in the BGP route advertisement messages transmitted from the standby host node is shorter than the AS path in the BGP route advertisement messages transmitted from the active host node.

Figure 2:
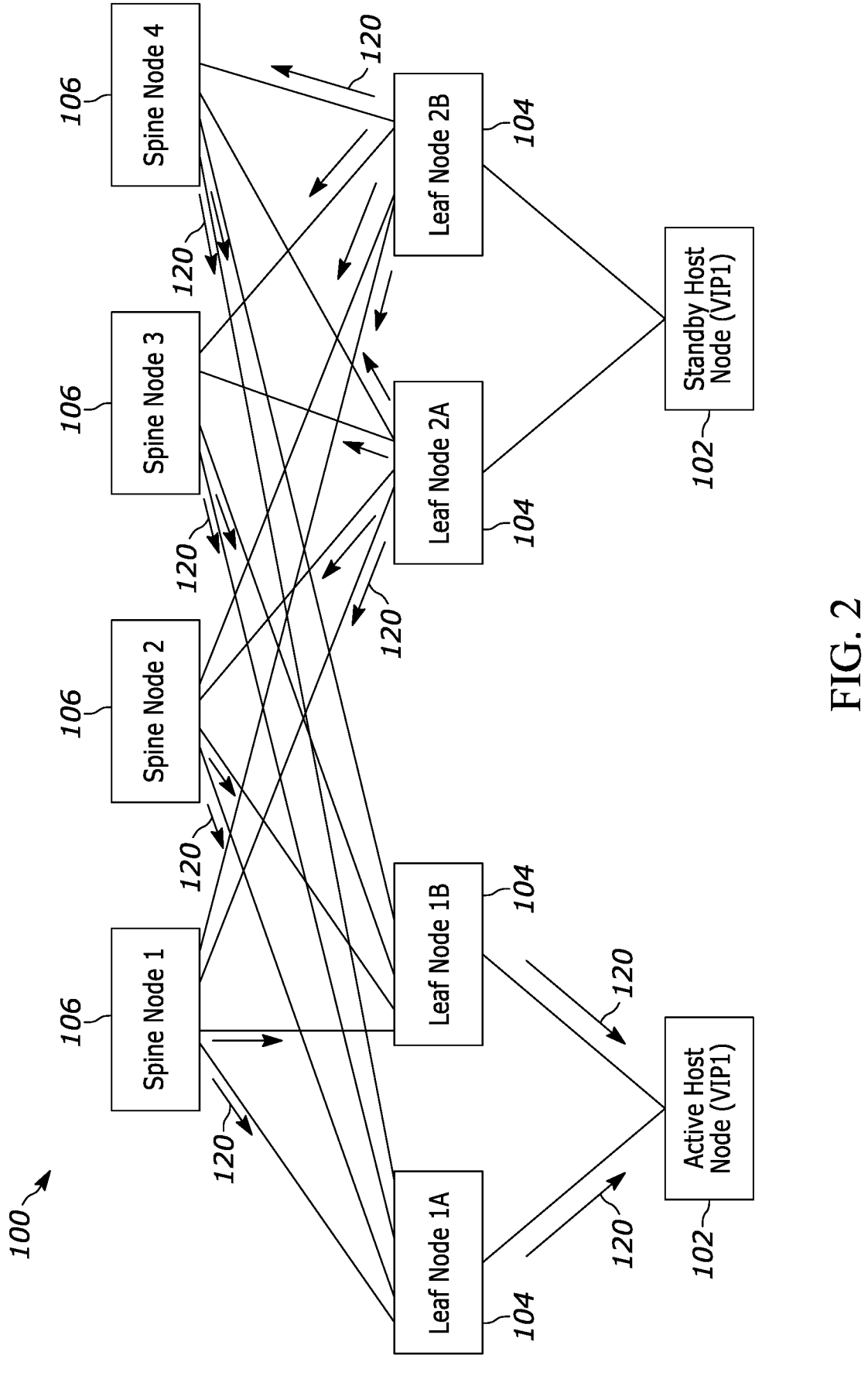
FIG. 2 illustrates the leaf nodes and the spine nodes routing traffic destined to VIP1 to the active host node.

Once the BGP route advertisement messages 110 transmitted from the active and standby host nodes 102 propagate to all of the leaf nodes 104 and the spine nodes 106 in the network, forwarding tables maintained in the leaf nodes and in the spine nodes will be configured to route traffic destined to VIP1 to the active host node. FIG. 2 illustrates the leaf nodes 104 and the spine nodes 106 routing traffic destined to VIP1 to the active host node. For example, the arrows 120 illustrate traffic destined to VIP1 going to the active host node. Such a routing pattern is a result of the forwarding tables (e.g., routing tables) of the leaf nodes and spine nodes prioritizing the AS paths to the active host node over the paths to the standby host node. The traffic pattern as illustrated in FIG. 2 will be maintained unless there is some change in the network, such as a failure of the active host node. Of course, the standby host node remains ready to take over support of the network service in the event of a failure of the active host node or a failure in the ability of traffic to reach the active host node. However, in some situations it may be desirable to intentionally plan a switch of support of the network service from the active host node to the standby host node. Such a planned switchover may be useful for various reasons, including to perform a software and/or hardware update on the active host node while maintaining the availability of the network service.

Figure 3:
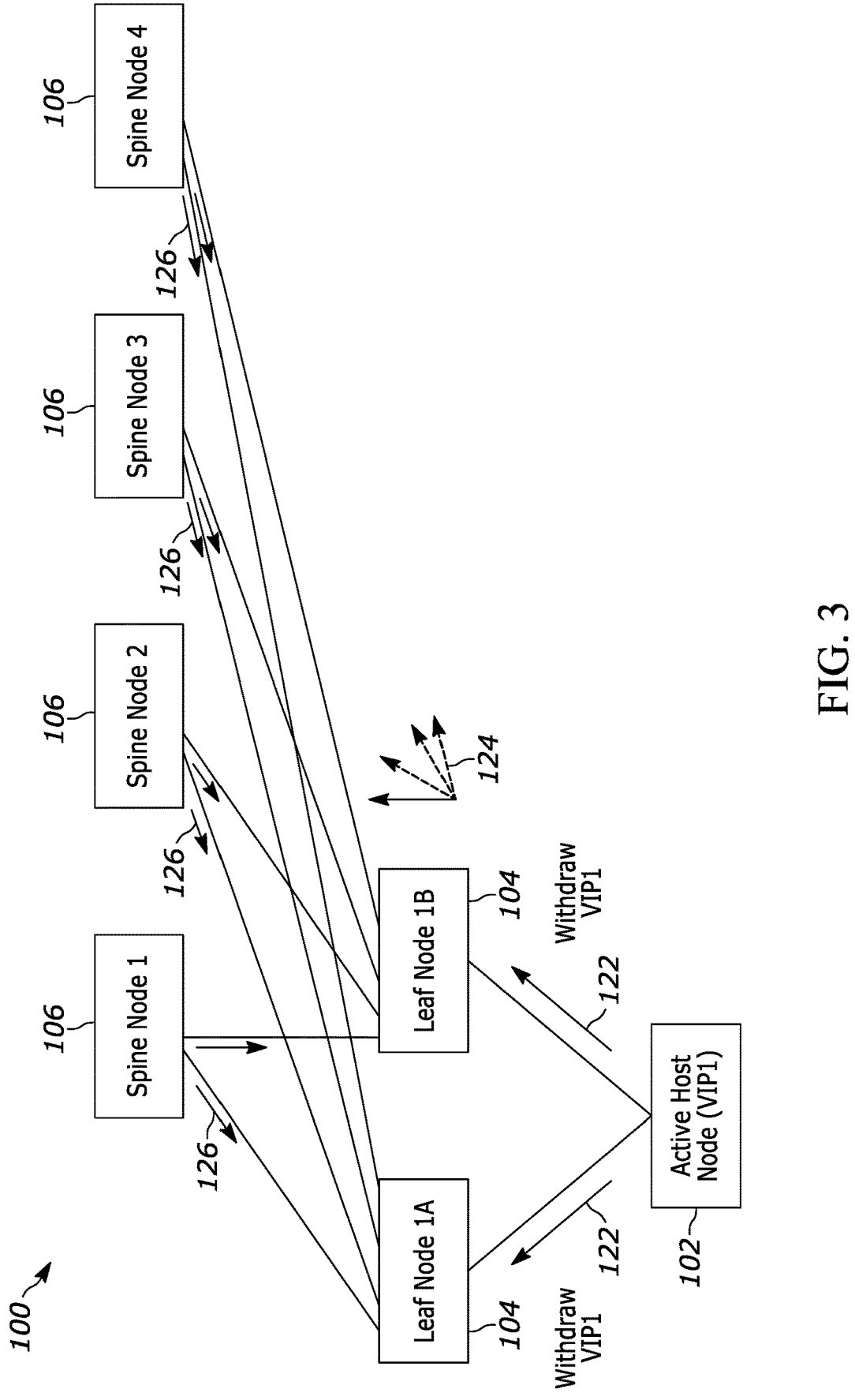
FIG. 3 illustrates an example of the problem of path hunting that may occur when the active host node transmits a BGP withdrawal message in the leaf-spine network topology.

A planned switchover from the active host node to the standby host node can be implemented using various conventional techniques. For example, a planned switchover from the active host node to the standby host node can be implemented by the active host node transmitting a BGP route withdrawal message that will cause the leaf nodes and the spine nodes in the network to route traffic intended for VIP1 to the standby host node. Although the forwarding tables maintained by the leaf nodes and the spine nodes will eventually be reconfigured to route traffic to the standby host node, there may be some delay in updating the forwarding tables that can result in packet loss. For example, an observed phenomenon of "path hunting" may be experienced. FIG. 3 illustrates an example of the problem of path hunting that may occur when the active host node transmits a BGP withdrawal message 122 in the leaf-spine network topology. In the example of FIG. 3 (which omits leaf nodes 2A and 2B and the standby host node for clarity), before the BGP withdraw message is transmitted from the active host node, leaf node 1B has multiple redundant routes to VIP1, including the preferred route received from the active host node itself, and multiple backup routes received at each spine node from leaf node 1A. When leaf node 1B receives the BGP route withdrawal message from the active host node, leaf node 1B hunts down each redundant AS path, as illustrated by arrow 124, until leaf node 1B receives BGP withdrawal messages from all of the spine nodes. For example, because of the redundant topology of the network, the same route is advertised along multiple paths and hence, even after the original route advertisement is withdrawn, a BGP node may keep switching to the alternate stale path until one-by-one all of the paths are withdrawn and the BGP node eventually converges to the desired route to the standby host node. At each occurrence of a BGP node switching to the next alternate stale path when a previous path has been withdrawn, leaf node 1B routes traffic destined for VIP1 towards a spine node. However, as the path hunting process may be happening quite rapidly, it is possible (as illustrated by arrows 126) that the forwarding tables of the spine nodes are still pointing traffic to leaf node 1A or to leaf node 1B as the spine nodes may not have fully processed the BGP withdrawal messages from the active host node. Traffic from leaf nodes 1A and/or 1B that is forwarded back to leaf nodes 1A and/or 1B results in routing loops, which may cause packets to be lost, e.g., dropped.

Another technique for implementing a planned switchover from an active host node to a standby host node in a leaf-spine network involves manipulating the length of the AS paths in the BGP route advertisement messages to change the preferences in the forwarding tables of the leaf nodes and the spine nodes. Manipulating the length of the AS paths often involves the recalculation of AS path lengths and coordination between the active host node and the standby host node to re-advertise the modified AS path lengths in a coordinated manner.

Rather than relying solely on BGP withdraw messages or the coordinated manipulation of AS path lengths, a planned switchover from an active host node to a standby host node in a leaf-spine network can be implemented using a BGP community tag to preemptively attract routes associated with a particular destination IP address to the standby host node so that the leaf nodes and spine nodes update their forwarding tables to point to the standby host node before the active host node withdraws the particular IP address. For example, in a leaf-spine network similar to the network 100 described with reference to FIGS. 1-3, a standby host node is configured to transmit a community tag, which is indicative of a graceful attract community, in BGP route advertisement messages and the leaf nodes and spine nodes are configured to recognize the community tag as the graceful attract community and prioritize the corresponding route information in forwarding tables such that routes associated with destination IP address VIP1 point to the standby host node instead of to the active host node. After some convergence time has elapsed, the active host node transmits BGP withdraw messages to complete the withdrawal of destination IP address VIP1 throughout the network. At some point after the active host node has transmitted the BGP route withdraw messages, the standby host node stops including the community tag, which is indicative of the graceful attract community, in BGP route advertisement messages. By using a community tag to preemptively attract routes associated with a destination IP address to the standby host node, the corresponding routes learned by leaf nodes and spine nodes in the network can converge on the standby host node before the active host node withdraws the destination IP address, thereby implementing a planned switchover from an active host node to a standby host node that avoids the problem of path hunting and associated packet loss.

Figure 4:
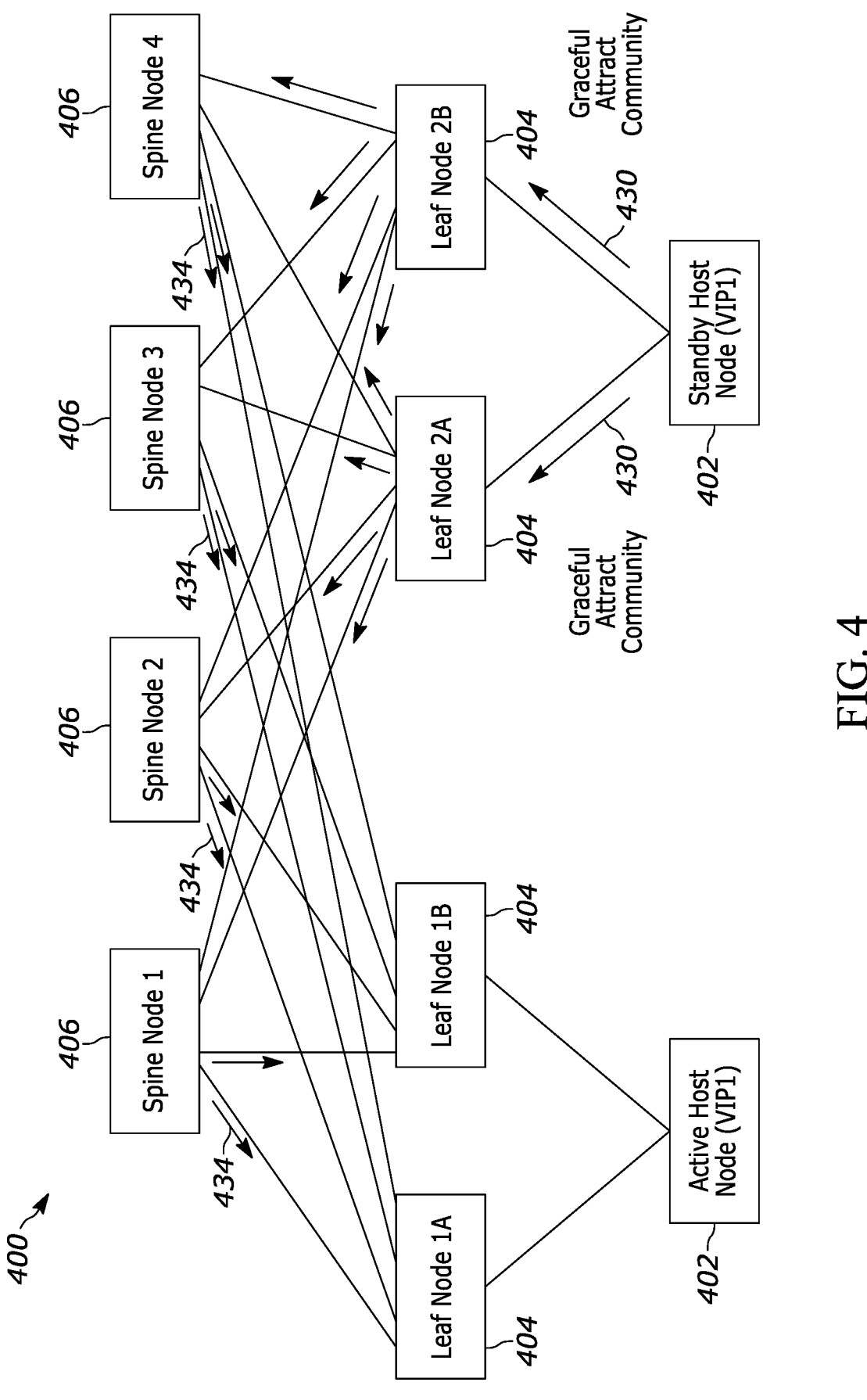
FIG. 4 depicts an example of a network that includes host nodes, leaf nodes, and spine nodes similar to the network described with reference to FIGS. 1-3.

An example of the technique for implementing a planned switchover from an active host node to a standby host node is described with reference to FIGS. 4-14. FIG. 4 depicts an example of a network 400 that includes host nodes 402, leaf nodes 404, and spine nodes 406 similar to the network 100 described with reference to FIGS. 1-3. FIG. 4 illustrates the standby host node transmitting BGP route advertisement messages 430 to leaf node 2A and to leaf node 2B. In addition, arrows 432 in FIG. 4 illustrate the BGP route advertisement messages being forwarded from leaf node 2A and from leaf node 2B to the spine nodes, spine nodes 1-4. As indicated by arrows 434, the spine nodes will also forward the BGP route advertisement messages to the leaf nodes, including to leaf nodes 1A, 1B, 2A, and 2B, ensuring that the BGP route advertisement messages are fully propagated throughout the leaf-spine network. In accordance with an embodiment of the invention, the BGP route advertisement messages include route information and a community tag. In an embodiment, the route information includes AS path information, next hop information, and network layer reachability information (NLRI) and the community tag includes a value that is indicative of a graceful attract community. Details related to the BGP route advertisement message, the route information, and the community tag are described below with reference to FIGS. 9-12.

As described with reference to FIG. 4, the BGP route advertisement messages 430 with the community tag that is indicative of the graceful attract community are received by the leaf nodes 404 and by the spine nodes 406. In accordance with an embodiment of the invention, the leaf nodes and the spine nodes are configured to identify the community tag as being indicative of the graceful attract community and in response, assign a higher BGP preference to the corresponding route information. For example, in response to identifying the community tag, the leaf and spine nodes that receive the BGP route advertisement messages prioritize the corresponding route information such that the corresponding forwarding tables (e.g., route tables) point traffic intended for VIP1 to the standby host node 402 instead of to the active host node. In an embodiment, the route information can be reprioritized by creating a BGP route-map, which is a table of rules with each rule having match criteria and actions. In such a case, there will be one rule whose match criteria is set to match any routes received with the graceful attract community and the corresponding action will be to set the BGP local-preference attribute for that route to be very high. As the default local-preference value is 100, the local preference would be set to a value greater than 100. In an embodiment, the local preference is a 32-bit number that is set to a value greater than 100. The local-preference is a well-known attribute used by the BGP best path selection logic to arbitrate amongst possible paths. According to the best path selection algorithm that is implemented by BGP, the local-preference is the first attribute that is evaluated and thus the local preference is used in this case to override any other best path selection.

FIG. 5 illustrates the leaf nodes and the spine nodes pointing to the standby host node for traffic intended to destination IP address VIP1 after having received the BGP route advertisement messages (430, FIG. 4) with the community tag that is indicative of the graceful attract community. In particular, arrows 436 illustrate traffic intended to destination IP address VIP1 being routed to the standby host node instead of to the active host node. As illustrated by FIGS. 4 and 5, a community tag, which is indicative of a graceful attract community, is used to cause the leaf nodes and the spine nodes to update their forwarding tables to point to the standby host node instead of to the active host node for traffic intended to destination IP address VIP1. For example, the forwarding tables (e.g., BGP-Routing Information Bases (RIBs) (B-RIBs)) maintained by BGP engines in the leaf nodes and the spine nodes are configured to route VIP1 traffic to the standby host node rather than to the active host node. In an embodiment, a BGP route-map is configured to match the graceful attract community with the local-preference action on all leaf and spine nodes (e.g., BGP nodes) in the network 400 so as to override the conventional behavior of selecting routes with shorter AS paths with the desired behavior of selecting a route to the standby host node 402. In an embodiment, an example route-map statement to implement the graceful attract operation may involve:

Router(config) ip community-list standard GRACEFUL_ATTRACT permit 65520:1
Router(config) route-map GRACEFUL_ATTRACT_LO-CAL_PREF_150 permit 10
Router(config-route-map) match community GRACEFUL_ATTRACT
Router(config-route-map) set local_preference 150

After such BGP route advertisement messages have been transmitted from the standby host node and after some convergence time has elapsed, the active host node transmits BGP route withdraw messages to leaf nodes 1A and 1B, and the messages propagate throughout the network. FIG. 6 illustrates the active host node 402 transmitting BGP route withdraw messages 440 (withdraw destination IP address VIP1) to leaf node 1A and leaf node 1B and arrows 442 and 444 illustrate the propagation of the BGP route withdrawal messages to the spine nodes 1-4 and to leaf nodes 2A and 2B, respectively. The BGP route withdraw messages ensure that network nodes that have not already updated their forwarding tables are notified of the route withdrawal. As explained above, when a BGP route with the graceful attract community is advertised by the standby host node, the leaf nodes and other spine nodes (e.g., the BGP nodes) in the network change their forwarding paths to route traffic intended for VIP1 to the standby host node. However, the process of updating the BGP nodes in the network is not instantaneous (e.g., the process takes some time to converge to the standby host node), and while the update process is progressing, some BGP nodes in the network will continue to forward traffic to the active host node instead of to the standby host node. Thus, withdrawing the routes to the active host node during the update process may result in some traffic being lost, e.g., dropped. In an embodiment, the convergence time is the time after which it is highly likely that the routes in all of the BGP nodes have been updated to route traffic destined to VIP1 to the standby host node instead of to the active host node. In an example, the convergence time may be calculated to be proportional to the time taken for hop-by-hop BGP route advertisement message propagation in the network times the number of hops along the path between the active host node and the standby host node. For example, if it takes Y milliseconds for each node to switch and propagate a BGP route advertisement message, then the convergence time can be calculated as Y milliseconds*number of hops along the path between active host node and the standby host node.

At some point in time after the standby host node has transmitted the BGP route advertisement messages 430 (FIG. 4) with the community tag, which is indicative of the grateful attract community, and the active host node 402 has transmitted the BGP route withdraw messages 440 (FIG. 6), the standby host node stops including the community tag in subsequent BGP route advertisement messages. FIG. 7 illustrates the standby host node transmitting additional BGP route advertisement messages 450 to leaf node 2A and to leaf node 2B without the community tag. Arrows 452 and 454 in FIG. 7 illustrate the propagation of the BGP route advertisement messages without the community tag amongst the spine nodes, spine nodes 1-4, and leaf nodes 1A and 1B, respectively. In an example, the graceful community tag is no longer included in BGP route advertisement messages after the routes to the active host node have been removed from the entire network so that the nodes do not revert back to routing traffic to the active host node when the graceful attract community tag is no longer included in the BGP router advertisement messages. In an example, with typical BGP operations (e.g., no add-path enhancement), the routes to the active host node would have been removed from the nodes in the network hop-by-hop along with the propagation of the BGP route advertisement messages with the graceful attract community. The route to the active host node would be retained only on the nodes immediately neighboring the active host node and hence, in an embodiment, the time window only needs to be the time needed to propagate from the active host node to all its immediate neighbor nodes.

In some cases, transmitting the BGP route advertisement messages from the standby host node without the community tag after a planned switchover from the active host node to the standby host node has been implemented could trigger path hunting at leaf nodes 2A and 2B. To avoid triggering path hunting at leaf nodes 2A and 2B, the BGP engines implemented in the leaf nodes may be configured to give higher preference to route information only when BGP route advertisement messages tagged with the graceful attract community are received directly from the standby host node but not when redundant copies of the route are received via the peer leaf node and the spine nodes.

In an embodiment, application of the graceful attract community is controlled by checking the AS Number (ASN) of a BGP route advertisement message before applying a preference to a route. For example, the BGP engines of the leaf nodes may be configured to not apply the graceful attract community if the route ASN in the BGP route advertisement message is the same as the ASN of the peer leaf nodes. FIG. 8 depicts an example of a network 800 that includes host nodes 802, leaf nodes 804, and spine nodes 806 and that is similar to the network 400. Additionally, FIG. 8 depicts that the active host node is in AS 100, the leaf nodes 1A and 1B are in AS 101, the standby host node is in AS 200, leaf nodes 2A and 2B are in AS 201, and the spine nodes are in AS 300. In the embodiment of FIG. 8, the BGP engines of leaf nodes 2A and 2B will not apply the graceful attract community as identified by a community tag in a BGP route advertisement message 830 if the BGP route advertisement message is received from a spine node because the route ASN in the BGP route advertisement messages received from the spine nodes will be 201 (e.g., route ASN 201=peer leaf 201) and the BGP engines of leaf node 2A and leaf node 2B will recognize the ASNs in the BGP route advertisement messages as an indication that the BGP route advertisement messages did not come directly from the standby host node. For example, each leaf node can identify that a received route is a copy advertised by the other leaf node in the pair via the spine if a particular leaf node sees its own ASN in the AS path of the received route. Once a leaf node sees its own ASN, the node can ignore the graceful attract community received in the copy. Thus, only the route directly received from the standby host node with the community tag indicative of the graceful attract community will trigger the graceful attract functionality and the copy with the community tag indicative of the graceful attract community will be treated as a route that was received without the community tag that is indicative of the graceful attract community. A route received in such a copy will be retained in the BGP route base as a backup route but will never be selected as the best route based on the presence of the graceful attract community.

In an example, the BGP policy can be defined with following rules that are evaluated from top to bottom until the first rule that matches:

a) If Route ASN==Peer-Leaf ASN
    Return
b) If Community contains Graceful-Attract
    Set higher LocalPreference
With reference to FIG. 8:
    the Peer-Leaf ASN is AS 101 on leaf node 1A and leaf node 1B; and
    the Peer-Leaf ASN is AS 201 on leaf node 2A and leaf node 2B.

With the configuration of ASNs as shown in FIG. 8, leaf node 2A and leaf node 2B will return without applying rule b) when a route to the standby host node tagged with the graceful attract community is received from a spine node because the BGP route advertisement message will have the ASN 201 in the AS path. That is, a comparison of the received Route ASN with the Peer-Leaf ASN will indicate that the ASNs are the same.

In contrast, leaf node 1A and leaf node 1B will apply policy b) when a route to the standby host node tagged with the graceful attract community is received from a spine node because leaf node 1A and leaf node 1B will not match conditions for rule a) because the AS path in the BGP route advertisement message from the standby host node will not have the Peer-Leaf ASN, e.g., ASN 101. That is, a comparison of the received Route ASN with the Peer-Leaf ASN will indicate that the ASNs are not the same.

Note that the above-described technique assumes that each leaf node or leaf node pair (e.g., leaf node pair 1A/1B and leaf node pair 2A/2B) has its own unique ASN to compare to the received ASN. If all of the leaf nodes share the same ASN, then it may be desirable to apply an outbound policy to tag BGP route advertisement messages crossing each leaf node pair with a unique community, e.g., a unique community tag that is different from the graceful attract community, in addition to the graceful attract community. In such an embodiment, the unique community tag would uniquely identify which leaf node pair advertised the route so that a check, similar to check a) above, could be performed by the unique community instead of the Peer-Leaf ASN. Thus, when the community tag for the graceful attract community is no longer included in BGP route advertisement messages, leaf nodes 2A and 2B have no other copy of the route with a higher local preference.

FIG. 9 depicts a Layer 2 (as described by the Open Systems Interconnection (OSI) model) frame 960 that includes a Layer 2 (L2) header 962, an IP header 964, a Transmission Control Protocol (TCP) header 966, a BGP frame 968, and a Frame Check Sequence (FCS) 970 in which the L2 header, IP header, TCP header, and FCS are well known in the field and are not described in further detail herein. As illustrated in FIG. 9, the BGP frame includes a BGP header 972 and a BGP message 974. The BGP header includes a marker (16 bytes), a length (2 bytes), and a type (1 byte), and the BGP message may be, for example, an Open message, an Update message, a Notification message, a Keepalive message, or a Route-Refresh message. The type field in the BGP header carries a type code in which: 1—Open, 2—Update, 3—Notification, 4—Keepalive, and 5—Route Refresh. The first four type codes are described in RFC 1771 and the last type code is defined in RFC 2918. FIGS. 10A-10E depict expanded views of the BGP message types. FIG. 10A depicts an Open message 976 that includes the following fields: Marker (16 bytes), Length (2 bytes), Type (1 byte), Version (1 byte), AS (2 bytes), Hold Time (2 bytes), BGP ID (4 bytes), an Optional Length (1 byte), and an Optional (7 bytes). FIG. 10B depicts an Update message 978 that includes the following fields: Marker (16 bytes), Length (2 bytes), Type (1 byte), Unfeasible Routes Length (2 bytes), Withdrawn Routes (variable number of bytes), Attribute Length (2 bytes), Attributes (variable number of bytes), and NLRI (variable number of bytes). FIG. 10C depicts a Notification message 980 that includes the following fields: Marker (16 bytes), Length (2 bytes), Type (1 byte), Error Code (1 byte), Error Sub-code (1 byte), and Diagnostic Data (variable number of bytes). FIG. 10D depicts a Keepalive message 982 that includes the following fields: Marker (16 bytes), Length (2 bytes), and Type (1 byte). FIG. 10E depicts a Route-Refresh message 984 that includes the following fields: Marker (16 bytes), Length (2 bytes), Type (1 byte), Address Family Identifier (2 bytes), Reserved (1 byte), and a Subsequent Address Family Identifier (1 byte).

In accordance with an embodiment of the invention, a community tag, which is indicative of the graceful attract community, is carried as an attribute in the Attributes field of an Update message (e.g., BGP Update message 978, FIG. 10B). As is known in the field, BGP route advertisement messages are transmitted as Update messages and the active-standby switchover technique described herein utilizes the Attributes field in an Update message to carry a community tag that is indicative of a graceful attract community. Some attributes have predefined type codes and attribute names and some attribute type codes are available for extended communities or reserved for future development. FIG. 11 depicts a table 1100 of attribute codes that can be used in BGP Update messages. As shown in FIG. 11, Type code "8" identifies the community attribute.

In an embodiment, a community is a 32-bit value split into two 16-bit sections. The first 16 bits typically encode the ASN that originated the community and the last 16 bits typically represent a unique number assigned by the AS. Some communities are well known in the field (e.g., RFC 8326, GRACEFUL_SHUTDOWN, 65535:0), and other communities can be customized for a particular purpose. In an embodiment, the community tag, which is indicative of the graceful attract community, is set at 65520:1, although other values for the graceful attract community are possible as long as the value is not used for any other purpose in the network. FIG. 12 depicts an embodiment of a frame 1260 in text format (which is similar to the frame format as depicted in FIG. 9), in which a community tag, which is indicative of the graceful attract community, is included as a Path Attribute in a BGP Update message, e.g., a BGP route advertisement message. The BGP Update message of FIG. 12 also includes route information such as path information, next hop information, and/or NLRI. As described above, identification of the graceful attract community causes the receiving node (e.g., leaf node or spine node) to prioritize the route information for an IP address in the message over other route information for the same IP address.

In an embodiment, the BGP engines of the host nodes, the leaf nodes, and the spine nodes are configured to implement the active-standby planned switchover using the graceful attract community. In some embodiments, the BGP engines are implemented in an edge device, such as a network interface card (NIC), or a SmartNIC, that is configured to run a modified BGP protocol. FIG. 13 is an example of a host node 1302 that includes an edge device 1314 that is configured to run a modified BGP protocol as described herein. For example, with respect to the active and standby host nodes as described with reference to FIGS. 4-8, the edge device is configured to generate BGP route advertisement messages with the graceful attract community tag, and to transmit BGP withdraw messages and BGP route advertisement messages without the community tag to implement an active-standby planned switchover as described above. In some embodiments, the leaf nodes and spine nodes also include an edge device similar to that shown in FIG. 13 that implements a modified BGP protocol with graceful attract community. With regard to the leaf nodes and spine nodes, the edge device is configured to identify the graceful attract community and to prioritize route information as described above.

With reference to FIG. 13, the edge device 1314 is shown relative to a host computer 1312, in which the edge device and host computer form the host node 1302. In the embodiment of FIG. 13, the edge device is a NIC (also referred to as a SmartNIC) that is configured to operate within the host node in which the host computer provides, for example, storage and/or compute resources. In other embodiments, the edge device may be single IC device, such as packet processor IC device, in which case the edge device may not include certain elements such as physical layer (PHY) elements (e.g., PHY transmitters/receivers and port connectors), additional memory, power management etc., which are typically part of a NIC. In another embodiment, the edge device can be a network node, or a part thereof, such as a leaf node and/or a spine node.

In the example of FIG. 13, the edge device 1314 includes a host interface 1330 and a network interface 1340 along with a memory 1331, a coherent interconnect 1332, a packet processing circuit 1333, CPU cores 1334, service processing offloads 1335, and a packet buffer 1336. Although an example architecture of the edge device is described with reference to FIG. 13, other architectures of the edge device are possible.

In an embodiment, the host interface 1330 of the edge device 1314 is a PCIe interface that provides a high speed connection to the host computer 1312 and the network interface 1340 includes multiple ports, such as Ethernet ports 1338, that enable the edge device to communicate with other computing systems via network connections. In an embodiment in which the edge device is a NIC, the PCIe interface may include a PCIe port with a physical layer (PHY) interface and connector, and the Ethernet ports may include physical layer Ethernet ports and connectors, which may be, for example, optical PHY ports and/or twisted-pair PHY ports. In an embodiment in which the edge device is a single IC device, the host interface may include pins on the IC device that correspond to a PCIe physical interface and the network interface may include pins on the IC device that correspond to MAC level Ethernet communications.

The memory 1331 of the edge device 1314 can include memory for running Linux or some other operating system, memory for storing data structures such as the flow cache, statistics, and other analytics, and memory for providing buffering resources for advanced features including TCP termination and proxy, deep packet inspection, and storage offloads. The memory may include a high bandwidth module (HBM) that may support, for example, 4 GB capacity, 8 GB capacity, or some other capacity depending on package and HBM. Memory transactions in the edge device, including host memory, on board memory, and registers may be connected via the coherent interconnect 1332. In one non-limiting example, the coherent interconnect can be provided by a network on a chip (NOC) "IP core". Semiconductor chip designers may license and use prequalified IP cores within their designs. Prequalified IP cores may be available from third parties for inclusion in IC devices produced using certain semiconductor fabrication processes.

In an embodiment, the packet processing circuit 1333 implements a programmable packet processing pipeline that is programmable using a domain-specific language. For example, the concept of a domain-specific language for programming protocol-independent packet processors, known simply as "P4," has developed as a way to provide some flexibility at the data plane of an edge device. The P4 domain-specific language for programming the data plane of network appliances is currently defined in the "P4$_{16}$ Language Specification," version 1.2.0, as published by the P4 Language Consortium on Oct. 23, 2019, which is incorporated by reference herein. P4 (also referred to herein as the "P4 specification," and the "P4 language") is designed to be implementable on a large variety of targets including programmable NICs, software switches, hardware switches, FPGAs, and ASICs. As described in the P4 specification, the primary abstractions provided by the P4 language relate to header types, parsers, tables, actions, match-action units, control flow, extern objects, user-defined metadata, and intrinsic metadata. The packet processing pipeline edge device may include an arbiter, a parser, a match-action pipeline, a deparser, and a demux/queue that constitute a P4 programmable NIC, a P4 programmable packet processor IC device, or some other architecture. The arbiter can act as an ingress unit receiving packets from RX-MACs and can also receive packets from a control plane via a control plane packet input. The arbiter can also receive packets that are recirculated to it by the demux/queue. The demux/queue can act as an egress unit and can also be configured to send packets to a drop port (the packets thereby disappear), to the arbiter via recirculation, and to the control plane via an output CPU port or via the coherent interconnect 1332. The control plane is often referred to as a CPU (central processing unit) although, in practice, control planes often executes on multiple CPU cores and other elements. The arbiter and the demux/queue can be configured through the domain-specific language (e.g., P4). In an embodiment, elements of a BGP engine, including the maintenance of forwarding information in forwarding tables (e.g., a Routing Information Base (RIB)), may be implemented in the packet processing circuit.

In an embodiment, the CPU cores 1334 are general purpose processor cores, such as ARM processor cores, Microprocessor without Interlocked Pipeline Stages (MIPS)

processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C. In an embodiment, elements of a BGP engine, including the maintenance of forwarding information in forwarding tables (e.g., an RIB), may be implemented in the CPU cores.

The service processing offloads 1335 are specialized hardware modules purposely optimized to handle specific tasks at wire speed, such as cryptographic functions, compression/decompression, etc.

The packet buffer 1336 can act as a central on-chip packet switch that delivers packets from the network interfaces 1340 to packet processing elements of the edge device 1314 and vice-versa.

In an embodiment, the edge device 1314 as described with reference to FIG. 13 is configured to implement a process that involves processing BGP route advertisements. FIG. 14 is a process flow diagram of a method for processing BGP route advertisements that is implemented by an edge device that is integrated into a leaf node and/or a spine node. At block 1402, a BGP route advertisement is received at an edge device. At decision point 1404, the edge device determines if an ASN in the BGP route advertisement message matches its own ASN. If it is determined that the ASN in the BGP route advertisement message matches its own ASN, then at block 1406, the process ends. If however, it is determined that the ASN in the BGP route advertisement message does not match its own ASN, then the process proceeds to decision point 1408. At decision point 1408, it is determined if the BGP route advertisement message has a community tag that matches a graceful attract community. If the BGP route advertisement message does not have a community tag that matches the graceful attract community, then at block 1406, the process ends. If however, it is determined that the BGP route advertisement message does have a community tag that matches the graceful attract community tag, then at block 1410, a route to the standby host node is prioritized over a route to the active host node. For example, a local-preference corresponding to the route to the standby host node is set to a high value, e.g., a value that causes the route to the standby host node to be selected as the best route for traffic destined to a particular IP address.

In an embodiment, some elements of the active-standby planned switchover operations described above with reference to FIGS. 4-14 are implemented in the packet processing circuit 1333. In other embodiments, the active-standby planned switchover operations described above with reference to FIGS. 4-14 are implemented by the CPU cores 1334 or a combination of the packet processing circuit, the CPU cores, and other elements of the edge device including, for example, the memory, the host interface, and/or the network interface.

In an embodiment, an active-standby planned switchover using the graceful attract community is coordinated by a policy and services manager (PSM) that is able to communicate with the host nodes, the leaf nodes, and the spine nodes (e.g., via edge devices such as the edge device 1314 described with reference to FIG. 13). FIG. 15 is an example of a PSM 1590 that is connected to a leaf-spine network 1500 such as the leaf-spine network described above. In an embodiment, the PSM is a computing system connected to the network that manages and delivers network and security policy to the network nodes (e.g., the host nodes, the leaf nodes, and the spine nodes) for services implementation. In an embodiment, the PSM manages network and security policies through the edge devices that are integrated into the host nodes, the leaf nodes, and the spine nodes. The PSM may utilize gRPC and RESTful APIs to communicate with the host nodes, the leaf nodes, and the spine nodes. In an embodiment, the PSM coordinates a planned switchover from the active host node to the standby host node using a graceful attract community as described above with reference to FIGS. 4-14. Although a PSM is shown in the example of FIG. 15, in other examples, there is some other centralized controller.

FIG. 16 is a process flow diagram of a method for orchestrating a switchover from an active host node to a standby host node that can be implemented by, for example, the PSM 1590 as shown in FIG. 15. At block 1602, a standby host node is directed (e.g., by the PSM) to transmit a BGP route advertisement message to a network that includes leaf nodes and spine nodes, the BGP route advertisement message including route information and a community tag that is indicative of a graceful attract community, wherein receiving the BGP route advertisement message at the leaf nodes and the spine nodes of the network causes the leaf nodes and the spine nodes to assign higher BGP preference to the route information in the BGP route advertisement message in response to identifying the community tag as being indicative of a graceful attract community. At decision point 1604, it is determined (e.g., by the PSM) if a convergence time has expired. If the convergence time has not expired, the process continues to check whether or not the convergence time has expired. Once the convergence time has expired, the process proceeds to block 1606 and the active host node is directed (e.g., by the PSM) to transmit a BGP route withdraw message to the network after the BGP route advertisement message is transmitted from the standby host node. At decision point 1608, it is determined (e.g., by the PSM) if a graceful attract community tag removal time has expired. If the graceful attract community tag removal time has not expired, the process continues to check whether or not the graceful attract community tag removal time has expired. Once the graceful attract community tag removal time has expired, the process proceeds to block 1610 and the standby host node is directed (e.g., by the PSM) to transmit additional BGP route advertisement messages to the network without the community tag after the BGP route advertisement message is transmitted from the standby host node and after the BGP route withdraw message is transmitted from the active host node. In an embodiment and as described above, assigning higher BGP preference to the route information in the BGP route advertisement messages in response to identifying the community tag comprises finding a match of the community tag in a route-map and setting a local-preference attribute corresponding to the route information.

In the examples described above, the destination IP address is a "virtual" IP address because an association between the VIP and the actual hardware of the corresponding host nodes can be changed between the active host node and the standby host node. The concept of a virtual IP address is well known in the field.

Although the technique for implementing an active-standby planned switchover is described with reference to a particular leaf-spine network architecture, the technique for implementing an active-standby planned switchover may be applicable to other network architectures, including network architectures that are susceptible to path hunting. In an embodiment, the technique for implementing an active-standby planned switchover is implemented in a Clos network.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a non-transitory computer readable medium to store a computer readable program.

The computer-useable or non-transitory computer readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A network appliance comprising:

memory;

one or more processors;

a host interface;

a network interface; and a packet processing pipeline circuit;

the memory, one or more processors, host interface, network interface, and packet processing pipeline circuit configured to:

receive a Border Gateway Protocol (BGP) route advertisement message at the network appliance;

match a value of a community tag in the BGP route advertisement message to a value that is indicative of a graceful attract community;

in response to matching the value of the community tag in the BGP route advertisement message to the value that is indicative of the graceful attract community, set a local-preference attribute in a route-map of the network appliance for a route in the BGP route advertisement message, wherein the route that is set with the local-preference attribute corresponds to a standby host node; and route traffic to the standby host node according to the route-map;

wherein the local-preference attribute in the route-map for the route in the BGP route advertisement message with the value of the community tag that matches the value that is indicative of the graceful attract community is set when the BGP route advertisement message with the value of the community tag that matches the value that is indicative of the graceful attract community is received directly from the standby host node but not when the BGP route advertisement message with the value of the community tag that matches the value that is indicative of the graceful attract community is received from a spine node.

2. The network appliance of claim 1, wherein setting the local-preference attribute in the route-map of the network appliance node-prioritizes a route to the standby host node over a route to an active host node.

3. The network appliance of claim 1, wherein setting the local-preference attribute in the route-map of the network appliance changes a route to a destination IP address from a route to an active host node in a network to a route to the standby host node in the network.

4. The network appliance of claim 1, further configured to compare an Autonomous System Number (ASN) in a BGP route advertisement message with its own ASN to determine whether or not the BGP route advertisement message with the value of the community tag that matches the value that is indicative of the graceful attract community was received directly from the standby host node.

5. A method for operating a network node, the method comprising:

receiving a Border Gateway Protocol (BGP) route advertisement message at the network node;

matching a value of a community tag in the BGP route advertisement message to a value that is indicative of a graceful attract community;

in response to matching the value of the community tag in the BGP route advertisement message to the value that is indicative of the graceful attract community, setting a local-preference attribute in a route-map of the network node for a route in the BGP route advertisement message, wherein the route that is set with the local-preference attribute corresponds to a standby host node; and routing traffic to the standby host node according the route-map;

further comprising, setting the local-preference attribute in the route-map for the route information in the BGP route advertisement message with the value of the community tag that matches the value that is indicative of the graceful attract community when the BGP route advertisement message with the value of the community tag that matches the value that is indicative of the graceful attract community is received directly from the standby host node but not when the BGP route advertisement message with the value of the community tag that matches the value that is indicative of the graceful attract community is received from a spine node.

6. The method of claim 5, wherein setting the local-preference attribute in the route-map of the network node prioritizes a route to the standby host node over a route to an active host node.

7. The method of claim 5, wherein setting the local-preference attribute in the route-map of the network node changes a route to a destination IP address from a route to an active host node in a network to a route to the standby host node in the network.

8. The method of claim 5, wherein the network node compares an Autonomous System Number (ASN) in a BGP route advertisement message with its own ASN to determine whether or not the BGP route advertisement message with the value of the community tag that matches the value that is indicative of the graceful attract community was received directly from the standby host node.

9. An integrated circuit device comprising:
memory;
one or more processors;
a host interface;
a network interface; and
a packet processing circuit;
the memory, one or more processors, host interface, network interface, and packet processing circuit configured to:
receive a Border Gateway Protocol (BGP) route advertisement message at the integrated circuit device;
match a value of a community tag in the BGP route advertisement message to a value that is indicative of a graceful attract community;
in response to matching the value of the community tag in the BGP route advertisement message to the value that is indicative of the graceful attract community, set a local-preference attribute in a route-map of the integrated circuit device for a route in the BGP route advertisement message, wherein the route that is set with the local-preference attribute corresponds to a standby host node; and
route traffic to the standby host node according to the route-map;
wherein the local-preference attribute in the route-map for the route in the BGP route advertisement message with the value of the community tag that matches the value that is indicative of the graceful attract community is set when the BGP route advertisement message with the value of the community tag that matches the value that is indicative of the graceful attract community is received directly from the standby host node but not when the BGP route advertisement message with the value of the community tag that matches the value that is indicative of the graceful attract community is received from a spine node.

10. The integrated circuit device of claim 9, wherein setting the local-preference attribute in the route-map of the integrated circuit device prioritizes a route to the standby host node over a route to an active host node.

11. The integrated circuit device of claim 9, wherein setting the local-preference attribute in the route-map of the integrated circuit device changes a route to a destination IP address from a route to an active host node in a network to a route to the standby host node in the network.

12. The integrated circuit device of claim 9, further configured to compare an Autonomous System Number (ASN) in a BGP route advertisement message with its own ASN to determine whether or not the BGP route advertisement message with the value of the community tag that matches the value that is indicative of the graceful attract community was received directly from the standby host node.

13. A method for operating an integrated circuit device, the method comprising:

receiving a Border Gateway Protocol (BGP) route advertisement message at the integrated circuit device;

matching a value of a community tag in the BGP route advertisement message to a value that is indicative of a graceful attract community;

in response to matching the value of the community tag in the route advertisement message to the value that is indicative of the graceful attract community, setting a local-preference attribute in a route-map of the integrated circuit device for a route in the BGP route advertisement message, wherein the route that is set with the local-preference attribute corresponds to a standby host node; and routing traffic to the standby host node according the route-map;

further comprising, setting the local-preference attribute in the route-map for the route information in the BGP route advertisement message with the value of the community tag that matches the value that is indicative of the graceful attract community when the BGP route advertisement message with the value of the community tag that matches the value that is indicative of the graceful attract community is received directly from the standby host node but not when the BGP route advertisement message with the value of the community tag that matches the value that is indicative of the graceful attract community is received from a spine node.

14. The method of claim 13, wherein setting the local-preference attribute in the route-map of the integrated circuit device prioritizes a route to the standby host node over a route to an active host node.

15. The method of claim 13, wherein setting the local-preference attribute in the route-map of the integrated circuit device changes a route to a destination IP address from a route to an active host node in a network to a route to the standby host node in the network.

16. The method of claim 13, wherein the integrated circuit device compares an Autonomous System Number (ASN) in a BGP route advertisement message with its own ASN to determine whether or not the BGP route advertisement message with the value of the community tag that matches the value that is indicative of the graceful attract community was received directly from the standby host node.

\* \* \* \* \*